United States Patent
Russell

(10) Patent No.: US 9,441,784 B2
(45) Date of Patent: Sep. 13, 2016

(54) SUPPORT MECHANISM

(75) Inventor: Edwin Russell, Sorrento (AU)

(73) Assignee: 3D Space Arms Pty Ltd, Bentley (AU)

( * ) Notice: Subject to any disclaimer, the term of this patent is extended or adjusted under 35 U.S.C. 154(b) by 637 days.

(21) Appl. No.: 14/000,928

(22) PCT Filed: Feb. 22, 2011

(86) PCT No.: PCT/AU2011/000186
§ 371 (c)(1),
(2), (4) Date: Aug. 29, 2013

(87) PCT Pub. No.: WO2011/100807
PCT Pub. Date: Aug. 25, 2011

(65) Prior Publication Data
US 2013/0327911 A1 Dec. 12, 2013

(30) Foreign Application Priority Data

Feb. 22, 2010 (AU) .................. 2010900715
Oct. 24, 2010 (AU) .................. 2010904721

(51) Int. Cl.
*F16M 11/00* (2006.01)
*F16M 13/00* (2006.01)
(Continued)

(52) U.S. Cl.
CPC ............ *F16M 13/022* (2013.01); *A47B 17/03* (2013.01); *A47B 21/02* (2013.01);
(Continued)

(58) Field of Classification Search
CPC .. F16M 11/38; F16M 2200/06; F16M 11/06; F16M 11/08; F16M 11/10; F16M 11/2014; F16M 11/2021; A47B 21/02; A47B 21/0314
USPC ....... 248/274.1, 276.1, 277.1, 284.1, 292.12, 248/919; D14/452, 453
See application file for complete search history.

(56) References Cited

U.S. PATENT DOCUMENTS

| 508,938 A | 11/1893 | Hamilton |
| 1,893,295 A | 1/1933 | Le Bailly |

(Continued)

FOREIGN PATENT DOCUMENTS

| CN | 204647775 U | 9/2015 |
| DE | 4442642 A1 | 6/1996 |

(Continued)

OTHER PUBLICATIONS

International search report in application No. PCT/AU11/00186, dated Mar. 30, 2011.

*Primary Examiner* — Tan Le
(74) *Attorney, Agent, or Firm* — Oppedahl Patent Law Firm LLC

(57) ABSTRACT

A support mechanism (16) supports a first object (12) relative to a second object (14), in which the relative positioning is able to be changed in at least two dimensions, and preferably in three dimensions. The support mechanism (16) comprises a first fixing member (20) for fixing to the first object (12) and a second fixing member (22) for fixing to the second object (14). The support mechanism (10 also comprises a first movement mechanism (30,32, 34) which allows movement of a connection point (24) in a first direction relative to the first fixing member (20 and supports the connection point (24) relative to the first fixing member (20). The first direction may be fixed or it may be variable within a first plane. The first plane may be fixed or variable relative to the first fixing member. The support mechanism (16) also comprises a second movement mechanism (40) which allows movement of the second fixing member (22) in a second direction relative to the connection point (24) and supports the second fixing member (22) relative to the connection point (24). The second direction is at an angle to the first direction, preferably orthogonal. The second direction may be fixed or variable within a second plane. The second plane may be fixed or variable relative to the connection point (24).

25 Claims, 18 Drawing Sheets

(51) Int. Cl.
*A47B 21/03* (2006.01)
*F16M 13/02* (2006.01)
*A47B 17/03* (2006.01)
*A47B 21/02* (2006.01)
*F16M 11/04* (2006.01)
*F16M 11/08* (2006.01)
*F16M 11/10* (2006.01)
*F16M 11/20* (2006.01)
*F16M 11/24* (2006.01)

(52) U.S. Cl.
CPC ......... *A47B 21/0314* (2013.01); *F16M 11/04* (2013.01); *F16M 11/08* (2013.01); *F16M 11/10* (2013.01); *F16M 11/2092* (2013.01); *F16M 11/24* (2013.01); *F16M 13/00* (2013.01); *F16M 13/02* (2013.01); *F16M 2200/024* (2013.01); *F16M 2200/061* (2013.01)

(56) References Cited

U.S. PATENT DOCUMENTS

| | | | |
|---|---|---|---|
| 2,227,764 A | 1/1941 | Saunders et al. | |
| 3,179,072 A | 4/1965 | Coriell | |
| 4,055,329 A | 10/1977 | Hammond | |
| 4,546,708 A | 10/1985 | Wilburth | |
| 4,589,621 A | 5/1986 | Hunt et al. | |
| 4,632,349 A | 12/1986 | Anstey | |
| 4,706,575 A | 11/1987 | Hamlin | |
| 6,042,064 A | 3/2000 | Hong | |
| 6,076,785 A | 6/2000 | Oddsen, Jr. | |
| 6,179,262 B1 | 1/2001 | Ellard | |
| 6,527,235 B1 | 3/2003 | Cotterill | |
| 6,905,101 B1 | 6/2005 | Dittmer | |
| 6,905,102 B2 * | 6/2005 | Lin | 248/285.1 |
| 6,905,151 B2 | 6/2005 | Dittmer | |
| 6,923,505 B2 | 8/2005 | Siminovitch | |
| 7,264,212 B2 * | 9/2007 | Hung | 248/282.1 |
| 8,072,739 B2 * | 12/2011 | Dittmer | 248/274.1 |
| 8,191,487 B2 | 6/2012 | Theesfeld | |
| 9,004,430 B2 * | 4/2015 | Conner | 248/277.1 |
| 2004/0020097 A1 | 2/2004 | Deros | |
| 2006/0175498 A1 | 8/2006 | Tarone | |
| 2006/0186294 A1* | 8/2006 | Van Groesen et al. | 248/284.1 |
| 2008/0078906 A1* | 4/2008 | Hung | 248/276.1 |
| 2013/0032682 A1* | 2/2013 | Bell | 248/277.1 |

FOREIGN PATENT DOCUMENTS

| | | | |
|---|---|---|---|
| EP | 1219204 A2 | | 7/2002 |
| EP | 1586803 A2 | | 10/2005 |
| EP | 1672267 A2 * | | 6/2006 |
| WO | 95/34780 A1 | | 12/1995 |
| WO | 99/59446 A | | 11/1999 |

* cited by examiner

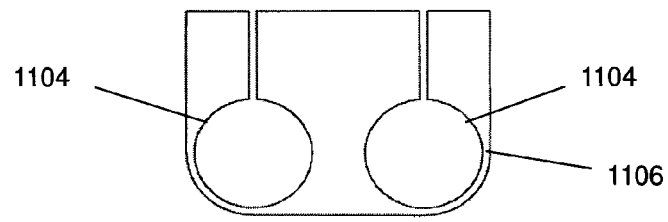
FIG 28
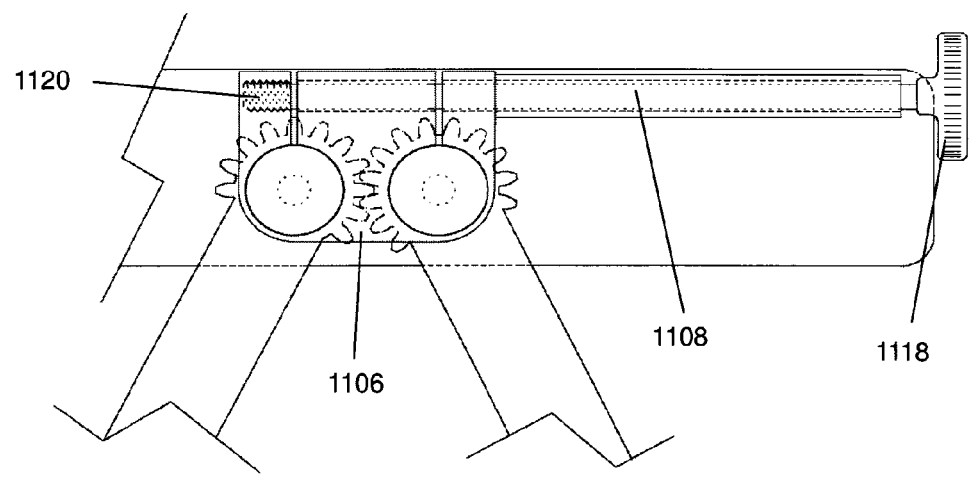
FIG 29
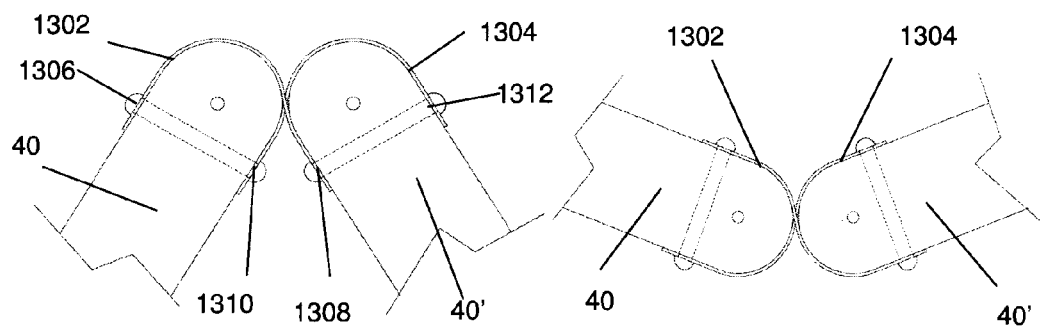
FIG 32
FIG 33

SUPPORT MECHANISM

FIELD OF THE INVENTION

The present invention relates to a mechanism for supporting a first object relative to a second object, where the position of the second object is able to be adjusted while still being supported.

BACKGROUND

There are numerous example of the need to support one object in relation to another. Some of these examples are: supporting a keyboard rest relative to a desktop; supporting a display mount for mounting a display unit relative to a structure, such as a wall or a desk; and supporting a storage rack or a work platform relative to a structure.

In the case of keyboard rests it is desirable to be able to move the rest from a stowed position under the desktop to an operational position. Additionally it is desirable to adjust the operational position according to the ergonomic needs of the individual user. However existing rests have limited adjustability.

In the case of display mounts it is desirable to move the position of the display unit to provide a desired viewing position and viewing angle, but current support mechanisms have limited degrees of freedom to move the mount.

The present invention seeks to provide a new support mechanism with a greater freedom to move the object being supported.

SUMMARY OF THE PRESENT INVENTION

According to a first aspect of the present invention there is provided a support mechanism comprising:
a first fixing member for fixing to a first object;
a second fixing member for fixing a second object;
a first movement mechanism configured to allow movement of at least one connection point in two dimensions within a first plane extending from the first fixing member; and
a second movement mechanism configured to allow movement of the second fixing member only in one or two dimensions within a second plane extending from the at least one connection point, where the first plane intersects with the second plane at an angle.

In an embodiment the movement of the second fixing member relative to each of the connection points is only in an arc.

In an embodiment the first plane is fixed relative to the second plane. In an embodiment the first plane is substantially orthogonal to the second plane.

In an embodiment the first movement mechanism is configured to lock the at least one connection point at a position in the first plane.

In an embodiment the second movement mechanism is configured to lock the second fixing member at a position in the second plane.

In an embodiment the first movement mechanism is configured to support the at least one connection point so as at to be load bearing through movement within the first plane.

In an embodiment the first movement mechanism is configured to prohibit movement of the at least one connection point outside of the first plane.

In an embodiment the second movement mechanism is configured to prohibit movement of the second fixing member outside of the second plane.

In an embodiment the second movement mechanism is configured to support the second fixing member so as at to be load bearing through movement within the second plane.

In an embodiment the angle of the first plane relative to the first fixing member is variably fixable.

In an embodiment the angle of the second fixing member relative to the second plane is variably fixable.

In an embodiment the at least one connection points is a pair of spaced apart connection points which are supported by the first movement mechanism so as to in turn support the second movement mechanism, the second fixing member and the second object.

In an embodiment the connection points are constrained to be equidistant from the first fixing member.

In an embodiment the distance between the connection points is variable.

In an embodiment the distance between the connection points is fixed.

In an embodiment the movement of the second fixing member is constrained to be orthogonal to a line passing through the connection points.

In an embodiment the connection points are configured to face in the same direction.

In an embodiment the first movement mechanism comprises at least one extension member having a first end pivotally connected to the first fixing member and a second end at which a connection point is supported, where the distance from the first end to the second end is variable by means of articulation or extension and retraction of the extension member.

In an embodiment each extension member comprises a pair of hinged elongate members.

In an embodiment each extension member comprises a telescopically extendable and retractable elongate member.

In an embodiment each extension member comprises a joint member that supports the connection point and allows the connection point to pivot with respect to the rest of the extension member.

In an embodiment the first movement mechanism comprises a track and a slider captured within the track, where the track permits movement of the slider in two dimensions within the first plane, wherein the slider supports the connection point.

In an embodiment the second movement mechanism comprises at least one lift member rotationally connected to a corresponding one of the least connection points and which is rotationally connected to the second fixing member.

In an embodiment the at least one lift member is a pair of elongate members linked to have their respective rotation in relation to the second fixing member the same, but in opposite directions.

In an embodiment the at least one lift member is a pair of elongate members linked by the second fixing member and another member to form opposite sides of a parallelogram.

In an embodiment the angle of each lift member with respect to the second fixing member is lockable.

In an embodiment the lift members are rotationally coupled.

In an embodiment the distance from the first end of each lift member to the second end of the same lift member is variable by means of extension and retraction of the lift member. In an embodiment each of the lift members is telescopically extendable.

In an embodiment the support mechanism is configured to lock displacement of the second fixing member relative to the first fixing member in one or more dimensions.

In an embodiment the second fixing member is rotatable within a third plane which is at an angle to the second plane. In an embodiment the third plane is orthogonal to the second plane.

In an embodiment the second fixing member is rotatable within a fourth plane which is at an angle to the second and third planes. In an embodiment the fourth plane is orthogonal to the second and third planes.

In an embodiment the second fixing member is rotatable within a fifth plane parallel to the second plane.

In an embodiment the connection points are constrained to be parallel to an element of the first fixing member.

In an embodiment the second fixing member is constrained to be parallel to a line extending between the connection points.

In an embodiment the second fixing member is constrained to be parallel to an element of the first fixing member.

In an embodiment second fixing member is arranged to orient the second object so as the present either of a first surface or a second surface of the second object for use.

In an embodiment the support mechanism is arranged to support the second object so as to be overlaid over the first object in a first configuration and to be under the first object in a second configuration.

In an embodiment the support mechanism is arranged to support the second object so as to be perpendicular to the first object.

In an embodiment the support mechanism is arranged to support the second object so as to be over and extend from the first object in a third configuration and to be under the first object in a second configuration.

In an embodiment the second object is provided with an extendable/retractable support surface.

In an embodiment the second movement mechanism comprises a linking means which restrains the angle of one lift member with respect to the second fixing member to be the opposite of the angle of the other lift member with respect to the second fixing member.

In an embodiment the connection points change their distance from each other as the lift members rotate with respect to the respective extension members.

In an embodiment the connection point is pivotally connected to the extension member.

In an embodiment the extension member moves through a horizontal plane.

In an embodiment the lift member moves through a vertical plane.

In an embodiment the second fixing member comprises an orientation means for orienting the second object relative to the second movement mechanism at a desired orientation. In one embodiment the orientation means comprises a hinge. In one embodiment the orientation means comprises a turntable means. In one embodiment the orientation means comprises a tilt means.

In an embodiment the second movement mechanism is configured to invert the second object from an end or side when positioned such that the connection joints are moved beyond an extremity of the first object and the second fixing member is moved from one side of the first object to the other side of the first object.

In an alternative to the first aspect of the invention, according to another aspect of the invention there is provided a support mechanism comprising:
a first fixing member for fixing to a first object;
a second fixing member for fixing a second object;
a first movement mechanism configured to allow movement of at least one connection point only within a first plane extending from the first fixing member, each connection point moving through an arc of variable radius; and
a second movement mechanism configured to allow movement of the second fixing member in one or two dimensions within a second plane extending from the at least one connection point, where the first plane intersects with the second plane at an angle.

In an alternative to the first aspect of the invention, according to another aspect of the invention there is provided a support mechanism comprising:
a first fixing member for fixing to a first object;
a second fixing member for fixing to a second object;
a first movement mechanism configured to support a pair of connection points so as to be load bearing and only permit movement of the connections points through two dimensions within a first plane extending from the first fixing member;
a second movement mechanism configured to support the second fixing member so as to be load bearing through movement in one or two dimensions within a second plane extending from the connection points and to prohibit movement of the second fixing member outside of the second plane, where the first plane intersects with the second plane at a fixed or variably fixable angle.

In an alternative to the first aspect of the invention, according to another aspect of the invention there is provided a support mechanism comprising:
a first fixing member for fixing to a first object;
a second fixing member for fixing to a second object;
a first movement mechanism comprising at least one extension member having a first end pivotally connected to the first fixing member and a second end at which a connection point is supported, where the distance from the first end to the second end is variable by means of extension and retraction of the extension member;
a second movement mechanism comprising at least one lift member rotationally connected to the connection point and which is rotationally connected to the second fixing member.

In an alternative to the first aspect of the invention, according to another aspect of the invention there is provided a support mechanism comprising:
a first fixing member for fixing to a first object;
a second fixing member for fixing to a second object;
a first movement mechanism comprising a pair of extension members, each having a first end pivotally connected to the first fixing member and a second end at which a respective connection point is supported, where the distance from each first end to the corresponding second end is variable by means of articulation or extension and retraction of the respective extension member;
a second movement mechanism comprising a lift member rotationally connected to each connection point, each lift member being only rotationally connected to the second fixing member.

In an alternative to the first aspect of the invention, according to another aspect of the invention there is provided a support mechanism comprising:
a first fixing member for fixing to a first object;
a second fixing member for fixing to a second object;
a pair of extension members, each having a first end pivotally connected to the first fixing member and a second end pivotally connected to a respective joint, where the distance from each first end to the corresponding second end is variable by means of articulation or extension and retraction of the respective extension member;

a lift member pivotally connected to each joint, the lift members being rotationally coupled so as to rotate by the same amount relative to the second fixing member, but in opposite directions.

In an alternative to the first aspect of the invention, according to another aspect of the invention there is provided a support mechanism comprising:
a first fixing member for fixing to a first object;
a second fixing member for fixing to a second object;
a first movement mechanism configured to enable one or more connection joints to extend towards or away from the first fixing member and or laterally with respect to the first fixing member;
a second movement mechanism comprising a lift member configured to enable the second fixing member to be moved orthogonally with respect to the connection joints.

In an alternative to the first aspect of the invention, according to another aspect of the invention there is provided a support mechanism comprising:
a first fixing member for fixing to a first object;
a second fixing member for fixing a second object;
a pair of connection joints of variable spacing along a line,
a first extension mechanism connecting the connection joints to the first fixing member such that the first fixing member is relatively movable parallel to the line and in a first direction at a first angle to the line; and
a second extension mechanism connecting the connection joints to the second fixing member such that the second fixing member is relatively movable in a second direction at a second angle to the line and at a third angle to the first direction.

Typically the first, second and third angles are 90 degrees. Other fixed or variable angles may be used.

In an alternative to the first aspect of the invention, according to another aspect of the invention there is a support mechanism comprising:
a first fixing member for fixing to a first object;
a second fixing member for fixing a second object;
a pair of connection joints of variable spacing along a line,
a first extension mechanism connecting the connection joints to the first fixing member such that the first fixing member is relatively movable parallel to the line and in a first direction at a first angle to the line, the first extension mechanism comprising a pair of articulated or telescopic members, each pivotally coupled to the first fixing member and pivotally coupled to the connection points; and
a second extension mechanism connecting the connection joints to the second fixing member such that the second fixing member is relatively movable in a second direction substantially perpendicular to the line and substantially perpendicular to the first direction, said second extension mechanism comprising a pair of rotationally coupled members, each revolutely coupled to one of the connection joints and revolutely coupled to the second fixing member.

According to one aspect of the present invention there is provided an apparatus comprising: a first object; a second object; and a support mechanism as defined above.

DETAILED DESCRIPTION OF EMBODIMENTS OF THE INVENTION

Embodiments of the present invention will now be described, by way of example only, with reference to the accompanying drawings, in which:

FIG. 28 is an elevation of a collar part of the height adjustment mechanism of FIG. 27;

FIG. 29 is a rear side elevation of a further alternative embodiment of a height adjustment locking mechanism of the support mechanism of the present invention;

FIG. 32 is a rear side elevation of a movement mirroring restraint mechanism of an embodiment of a support mechanism of the present invention when in a first configuration;

FIG. 33 is a rear side elevation of the mechanism of FIG. 32 when in a second configuration;

In general the present invention provides a support mechanism that is used to support a first object relative to a second object, in which the relative positioning is able to be changed in at least two dimensions, and preferably in three dimensions. The support mechanism comprises a first fixing member for fixing to the first object and a second fixing member for fixing to the second object. The support mechanism also comprises a first movement mechanism which allows movement of a connection point in a first direction relative to the first fixing member and supports the connection point relative to the first fixing member. The first direction may be fixed or it may be variable within a first plane. The first plane may be fixed or variable relative to the first fixing member. The support mechanism also comprises a second movement mechanism which allows movement of the second fixing member in a second direction relative to the connection point and supports the second fixing member relative to the connection point. The second direction is at an angle to the first direction, preferably orthogonal. The second direction may be fixed or variable within a second plane. The second plane may be fixed or variable relative to the connection point.

In an embodiment the first movement mechanism extends or retracts the connection point towards or away from the first fixing member. In an embodiment the first movement mechanism permits equidistant movement of the connection points relative to the first fixing member.

In an embodiment the second movement mechanism extends or retracts the second fixing member relative to the connection point.

By way of examples the support mechanism is described for use in supporting a keyboard rest (second object) relative to a desktop (first object), but it is not intended to be limited to this application.

Figure 1:
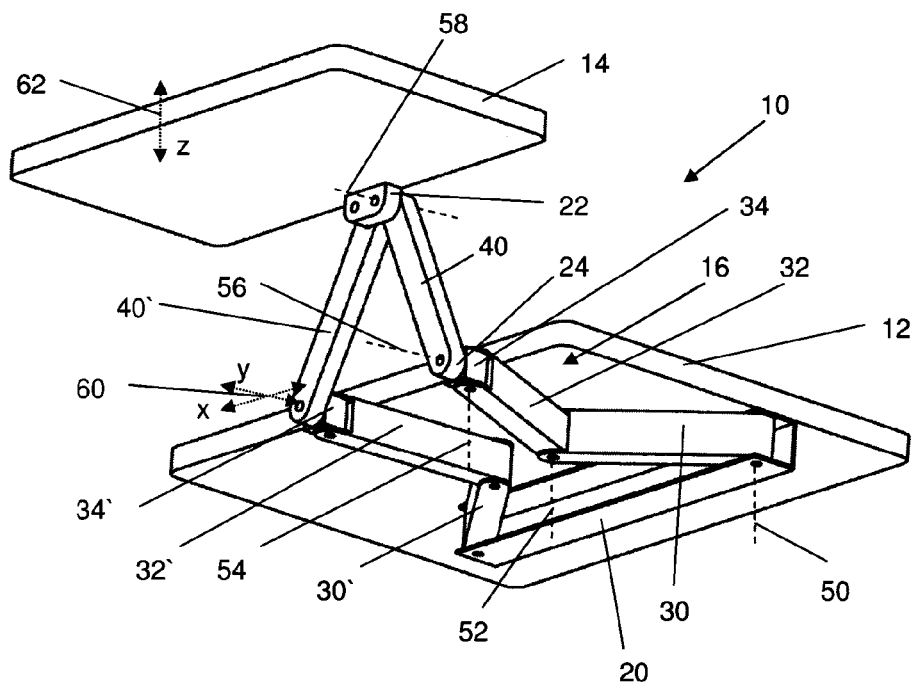
FIG. 1 is a lower perspective view of an embodiment of a support mechanism of the present invention in a first configuration.

Referring to FIG. 1, there is a desk with adjustable keyboard rest 10, which comprises a first object in the form of a desktop 12, a second object in the form of a keyboard rest 14 and a support mechanism 16 for adjustably supporting the keyboard rest 14 relative to the desktop 12.

The support mechanism 16 comprises a first fixing member 20 for fixing the support mechanism 16 to the desktop 12. The first fixing member 20 comprises a mounting plate, which is typically fastened to the desktop 12, such with a screw, bolt, rivet or other suitable fastener. In this example the member 20 is a C-section with one of the sides forming the mounting plate. The member 20 may be another suitable form of bracket or brackets. The support mechanism 16 comprises a second fixing member 22 for fixing the support mechanism 16 to the rest 14. The second fixing member 22 comprises a mounting surface which is typically fastened to the rest 14, such as with a screw or other suitable fastener. In this example the member 22 is a mounting block which includes the mounting surface and a surface for engagement with other parts of the support mechanism 16. The member 22 may comprise a suitable bracket or brackets.

The support mechanism 16 also comprises a first movement mechanism, which in this embodiment comprises a first elongate member 30 pivotally connected at one end to the first fixing member 20, a second elongate member 32 pivotally connected at one end to the other end of the first member 30 and a joint member 34 pivotally connected to the other end of the second member 32. Member 30 may be in the form of a square tube that pivots about an imaginary line 50. Line 50 is orthogonal to the under surface of the desktop 12 in this embodiment. A pin captured by the member 30 may extend through line 50 and engage with holes in the member 20 so as to form a hinge. Member 32 pivots about an imaginary line 52. In this embodiment line 52 is parallel with line 50. A hinge may be formed between members 30 and 32 by providing a pin captured by member 32 which extends through holes in the respective end of member 30. Joint member 34 pivots about an imaginary line 54. In this embodiment line 54 is parallel with line 52. A hinge may be formed between member 32 and the joint member 34 by providing a pin captured by joint member 34 which extends through holes in the respective end of member 32.

Joint member 34 comprises a surface which acts as a connection point 24 (although it may be a connection area) for supporting and connecting a second movement mechanism to the first movement mechanism.

By the arrangement of the members 30, 32 and joint member 34, the connection point 24 is able to move in a first direction relative to the first fixing member 20. In this embodiment the first direction is within a plane 60 extending from the first fixing member 20. In particular in this embodiment the plane 60 is parallel with the under surface of the desktop 12. This permits movement of the connection point 24 within the plane 60, but constrains it from movement outside of the plane 60. The plane 60 is indicated as having x-y co-ordinates. Thus connection point 24 can move along the x and y axes.

In this embodiment the second movement mechanism comprises an elongate member 40 pivotally coupled at one end to the connect point 24 of the joint member 34. In this embodiment member 40 is a bar, although it could have other forms, such as a square tube, or a telescopic member. Member 40 pivots about an imaginary line 56. Line 56 is orthogonal to the line 54 in this embodiment. A revolute joint may be formed between the joint member 34 and member 40 by providing a pin projecting from the connection point 34, through line 56, and arranging the member 40 to rotate about the pin.

The second fixing member 22 is pivotally coupled to another end of the member 40. The second fixing member 22 pivots about an imaginary line 58. Line 58 is parallel to the line 56 in this embodiment. A revolute joint may be formed between the member 22 and member 40 by providing a pin projecting from the member 22, through line 58, and arranging the member 40 to rotate about the pin.

By the arrangement of the joint member 34 and member 40, the second fixing member 22 is able to move in a second direction relative to the connection point 24. In this embodiment the second direction extends within a second plane extending from the connection point 24. In particular in this embodiment the second plane is orthogonal to the first plane 60. This permits movement of the second fixing member 22 within the second plane, but constrains it from movement outside of the second plane. The second plane coincides with a z axis 62 and the y axis of plane 60 and thus the second plane has y-z co-ordinates. Thus fixing member 22 can move along the z axis 62.

By virtue of the rest 14 being fastened to the fixing member 22 it too moves though the x-y axes as the connection point 24 moves and the rest 14 moves through the z axis as the member 40 pivots.

In the embodiment of FIG. 1 the first movement mechanism also comprises a first complementary set of members comprising an elongate member 30', elongate member 32' and joint member 34'. The elongate member 30' is pivotally connected at one end to the first fixing member 20 at a point spaced from the point the member 30 is connected. The elongate member 32' is pivotally connected at one end to the other end of the member 30'. The joint member 34' pivotally connected to the other end of the second member 32'. Members 30', 32' and joint member 34' are complementary to members 30 and 32 and joint member 34. In one configuration members 30', 32' and joint member 34' mirror members 30 and 32 and joint member 34 about a line extending from the midway point between the points at which members 30 and 30' connect to member 20.

Joint member 34' comprises a surface which acts as a second connection point for connecting a complementary member 40' to the complementary set of members of the first movement mechanism.

The pivot points of members 30', 32' and joint member 34', are parallel with the corresponding lines 50, 52 and 54 of the pivot points in the first movement mechanism. This allows the second connection point to move within the plane 60 so as to have the same displacement as the first connection point 24. Further the second connection point can remain parallel to the first connection point 24. Further the distance between the first connection point 24 and the second connection point can remain the same, or it can vary.

When the connection points only move through the y axis, the members 30, 32 and joint member 34 and the complementary set of member may mirror each corresponding counterpart. However when the connection points move through the x axis there may not be mirroring, even though the spacing and facing of the connection points may remain the same. As a result the angles between the members 20 and 30, 30 and 32 may be asymmetrical with the corresponding angles between the members 20 and 30' and 30' and 32'.

In this embodiment the connection points will not move relative to each other in the z axis 62 and will not move in the z axis relative to fixing member 20.

In the embodiment shown, the second movement mechanism also comprises the elongate member 40', which is pivotally coupled at one end to the second connection point of the joint member 34'. Member 40' pivots about an imaginary line which is parallel to the line 56. The second fixing member 22 is pivotally coupled to another end of the member 40'. The member 40' pivots about an imaginary line parallel to line 58.

When the members 40 and 40' pivot with respect to the connection points the fixing member 22 will move through the z axis and the connection points may move closer or further apart depending on the direction of rotation of the members 40 and 40'.

The angle of rotation of the member 40 with respect to the member 22 may be linked to the angle of rotation of the member 40'. In particular the respective angles may be the same, but in opposite directions of rotation. By this arrangement pivoting of the members 40 and 40' results in the fixing member 22 moving thought the z axis. This will cause the spacing of the connection points to change, but may not involve movement in the y axis, nor net movement of the connection points (the sum of the movement of the connection points) in the x axis.

As such the fixing member 22 and thus the rest 14 can move in though the x, y and z axes, that is, it can move in three dimensions relative to the fixing member 20 and thus the desktop 12.

Figure 2:
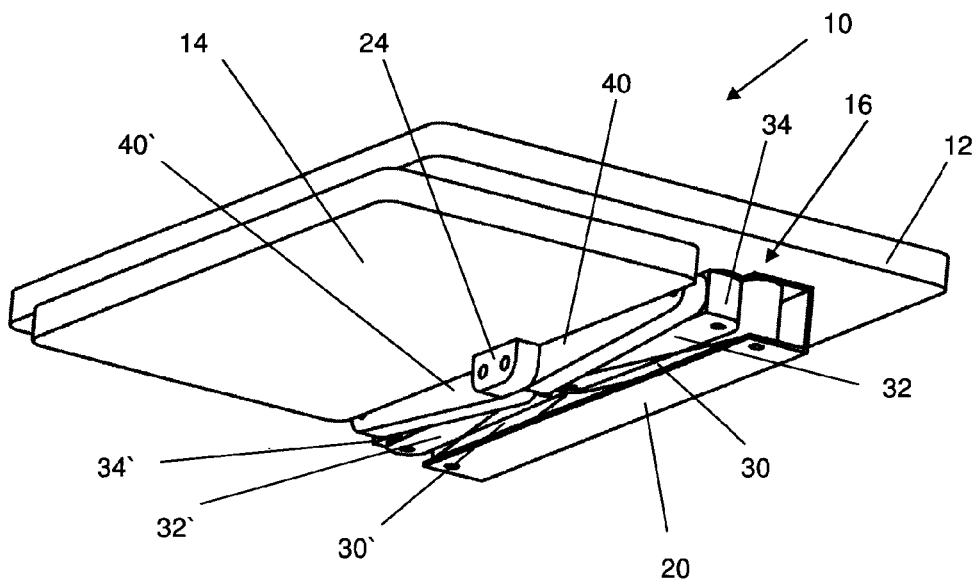
FIG. 2 is a lower perspective view of the embodiment of the support mechanism of FIG. 1 in a second configuration.

In the desk application, the rest 14 can be stowed in a configuration shown in FIG. 2 and moved to a convenient position that suits the user, such as that shown in FIG. 1, where the rest 14 has moved out from under the desk and is lifted (or lowered) to a desired position. Further sideways movement (left or right) can be achieved.

In FIG. 2 the members 30 and 30' are folded back to be nearly parallel with member 20 and nearly touching each other. Members 30 and 30' are in this example the same length, which is about half of the length of member 20. In an alternative, member 20 may be replaced by respective fixing members, one for member 30 and one for member 30'.

Members 32 and 32' are folded to also be nearly parallel with member 20. Members 32 and 32' are in this example the same length as each other and as members 30 and 30'.

In one embodiment the members 30 and 30' are the shorter in length than the members 32 and 32'.

Joints 34 and 34' are at their most spaced apart positions. Members 40 and 40' are near in line with each other and are near parallel with members 32 and 32'.

Thus member 22 is at its closest position to the member 20 and is about level with member 20 (along the z axis). Therefore rest 14 is mostly or fully underneath the desktop 12 and close to or abutting the under surface of the desktop 12.

To move the rest 14 to the position shown in FIG. 1, a user pulls the rest 14 out from under the desktop 12. This extends the first movement mechanism. In particular members 30 and 32' pivot away from the member 20 and members 32 and 32' also pivot away from member 20. Joint members 34 and 34' pivot to keep the connection points facing in the same direction.

Figure 3:
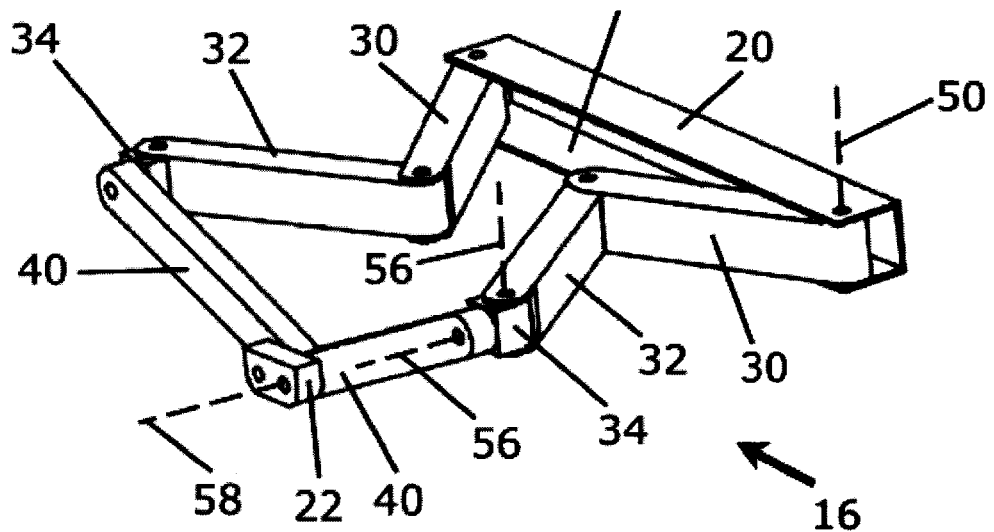
FIG. 3 is an upper perspective view of an embodiment of a support mechanism of the present invention.

The rest 14 may be lowered as it is being pulled out by pivoting members 40 and 40', which will cause relative movement of the joint members 34 and 34' and in turn pivoting of members 32 and 32'. This is depicted in FIG. 3. Also in FIG. 3 the rest (not shown) and member 22 have been moved left of centre. This causes pivoting of the joint member 34, member 32 and member 30 to be different to the pivoting of joint member 34', member 32' and member 30'.

However it may be desired to raise the rest 14. After the rest 14 has cleared the desktop 12, it can be lifted to be as shown in FIG. 1. This will cause pivoting of members 40 and 40', which will cause relative movement of the joints 34 and 34' and in turn pivoting of members 32 and 32'.

The rest 14 can be height adjusted or lowered and packed away for storage under the desktop 12 in a similar manner. When member 40 is telescopic, member 40' would also be telescopic, which would increase the height achievable by the rest 14 relative to the desktop 12 as member 40 and 40' are extended upwardly. Equally it can allow the rest 14 to be lower relative to the desktop 12 than without this telescopic feature.

An example of members 40 and 40' being telescopic is described further below in relation to FIGS. 34 and 35.

Figure 4:
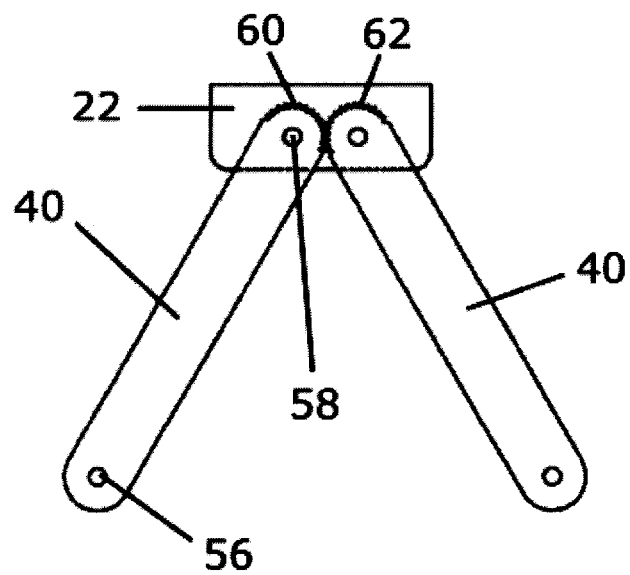
FIG. 4 is a side elevation a movement mechanism portion of the embodiment of the support mechanism of FIG. 1.

Referring to FIG. 4, an example of linking of the angles of members 40 and 40' with respect to the member 22 is shown. In this embodiment the ends of members 40 and 40' are rounded and are provided with interlocking gears having teeth 60 and 62, which force the angles of rotation to be the same, only in opposite directions. Other means of achieving this may be employed, such for example as by use of a worm screw which rotates with pivoting of each member 40 and 40' and a link pin that links the rotational displacement of each worm screw.

FIGS. 32 and 33 show an alternative to the gears. In this embodiment the members 40 and 40' are rotationally linked by flexible bands 1302 and 1304, which cross over so as to connect the bottom 1310 of member 40 to the top 1312 of the other 40' and the top 1306 of the member 40 to the bottom 1308 of the second member 40', such that the relative movement is by the same amount but in opposite directions of rotation.

Figure 5:
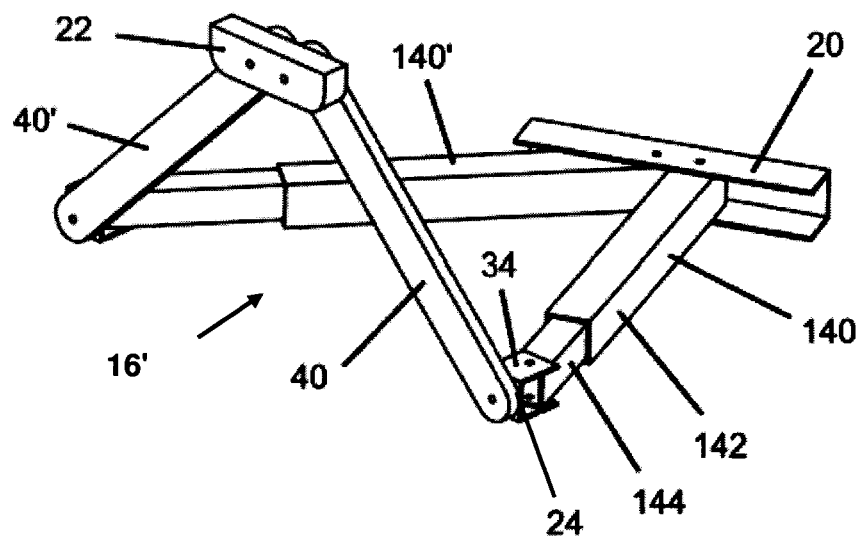
FIG. 5 is an upper perspective view of another embodiment of a support mechanism of the present invention in a first configuration.
Figure 6:
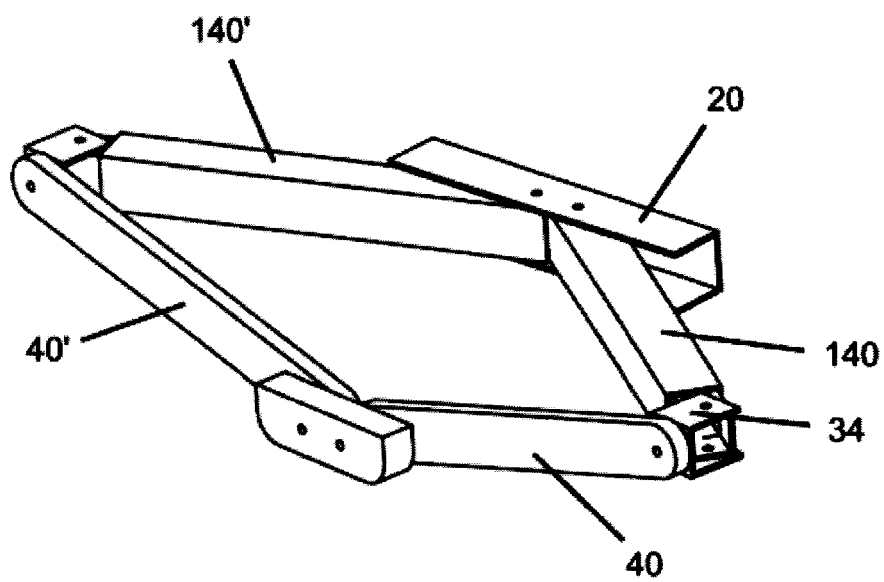
FIG. 6 is an upper perspective view of the embodiment of the support mechanism of FIG. 5 in a second configuration.

Referring to FIGS. 5 and 6, an alternative embodiment of the support mechanism 16' is shown. In this embodiment the support mechanism 16' comprises the first fixing member 20, the second fixing member 22 and the second movement mechanism as described above. However in this embodiment the first movement mechanism is different. It comprises a telescopic member 140 pivotally connected at one end to the first fixing member 20 and the joint member 34 is pivotally connected to the other end of the telescopic member 140. The telescopic member 140 comprises an outer tube 142 and an inner member 144 longitudinally moveable inside the member 142. In this case member 142 is pivotally connected to member 20 and member 144 is pivotally connected to joint member 34, but it could be the other way around.

Member 140 is pivotally connected to member 20 and joint member 34 in the same manner as hinged members 30 and 32 are in FIG. 1.

By the arrangement of the member 140 and joint member 34, the connection point 24 is able to move within the plane 60 extending from the first fixing member 20.

In this embodiment the first movement mechanism also comprises a complementary telescopic member 140'. The telescopic member 140' is pivotally connected at one end to the first fixing member 20 at point a near to but spaced from the point where the member 140 is connected. In contrast in FIG. 1 members 30 and 30' are pivotally connected to member 20 further apart.

In this embodiment, when the connection points only move through the y axis the telescopic members 140 and 140' pivot with respect to member 20 and extend or contract in length, and joint members 34 and 34' pivot with respect to the members 140 and 140'. However the connection points can also move through the x axis. In this case one of the telescopic members 140 or 140' may remain unchanged in length, while the other changes (contraction or extension), or the change in each may differ in direction and/or extent, along with the abovementioned pivoting.

In another embodiment the telescopic members 140 and 140' could be used in the first movement mechanism described in FIG. 1 in place of members 30 and 30'. This would increase the amount of movement achievable along the y axis. Alternatively or in addition telescopic members can be used in place of members 32 and 32'.

Figure 7:
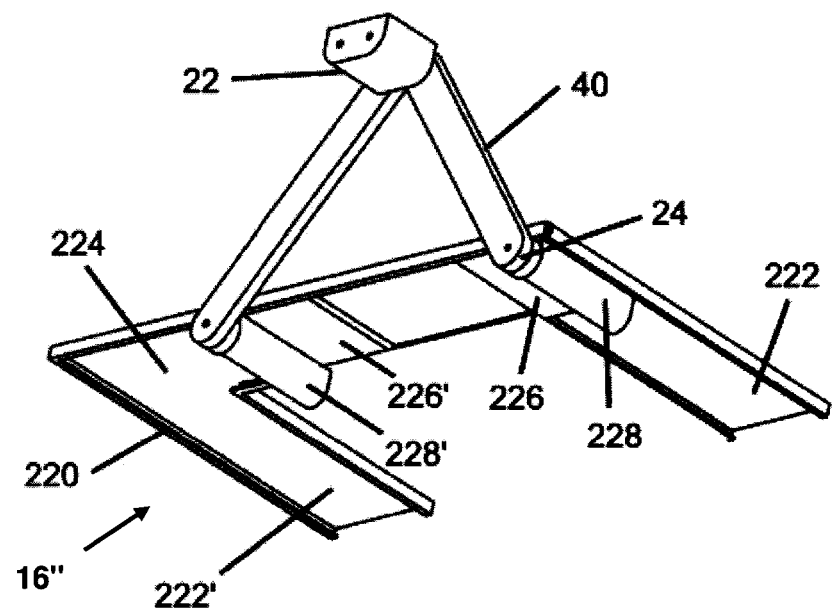
FIG. 7 is a lower perspective view of another embodiment of a support mechanism of the present invention in a first configuration.
Figure 8:
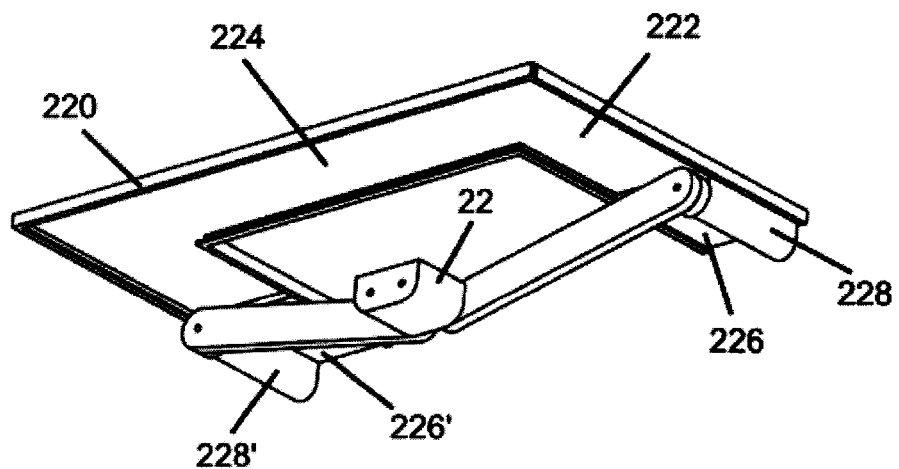
FIG. 8 is a lower perspective view of the embodiment of the support mechanism of FIG. 7 in a second configuration.

Referring to FIGS. 7 and 8, an alternative embodiment of the support mechanism 16" is shown. In this embodiment the support mechanism 16" comprises the first fixing member 20, the second fixing member 22 and the second movement mechanism as described above. However in this embodiment the first movement mechanism is different. It comprises a first guide 222 extending in a first direction and a second guide 224 extending in a second direction and leading from an end of the first guide 222.

The guides 222 and 224 may be connected to, or form, the fixing member 20. Captured within the guides 222 and 224 is a slider 226 which is able to traverse guide 222 transfer to or from guide 224 and traverse guide 224.

In this embodiment the guides 222 and 224 are at right angles and form an L shaped channel with side walls that hold the slider 226 captive. The slider 226 in this embodiment is a square plate. Coupled to the slider is a projection 228 which has a surface that forms the connection point 24. In this embodiment the projection 228 is generally a half circle or square tube. In an alternative the connection point 24 may be laterally movable (along the x axis) relative to the projection 228, by for example sliding within another guide coupled to the projection 228.

By the arrangement of the slider 226 and guides 222 and 224, the connection point 24 is able to move within a plane parallel to the guides 222 and 224 (similar to plane 60).

The first movement mechanism also comprises another guide 222' and complementary slider 226'. The guide 222' extends from an end of the guide 224. In this embodiment the guide 222' is at right angles to and forms an L shape with guide 224, and these in combination with guide 222 form a U shape.

Captured within the guide 222' and 224 is the complementary slider 226' which is able to traverse guide 222' transfer to or from guide 224 and traverse guide 224.

The slider 226' in this embodiment is a square plate. Coupled to the slider 226' is a projection 228' which has a surface that forms the other connection point.

In this embodiment, when the connection points only move through the y axis the sliders 226 and 226' move within guides 222 and 222' respectively. When the connection points move through the x axis the sliders move within guide 224.

Guide 224 is about as long as the maximum spacing of the connection points and guides 222 and 222' are about as long as the maximum movement desired in the y axis.

When the member 22 moves along the z axis the spacing between the connection points changes and thus the positions of the sliders 226 and 226' within guide 224 change.

Figure 9:
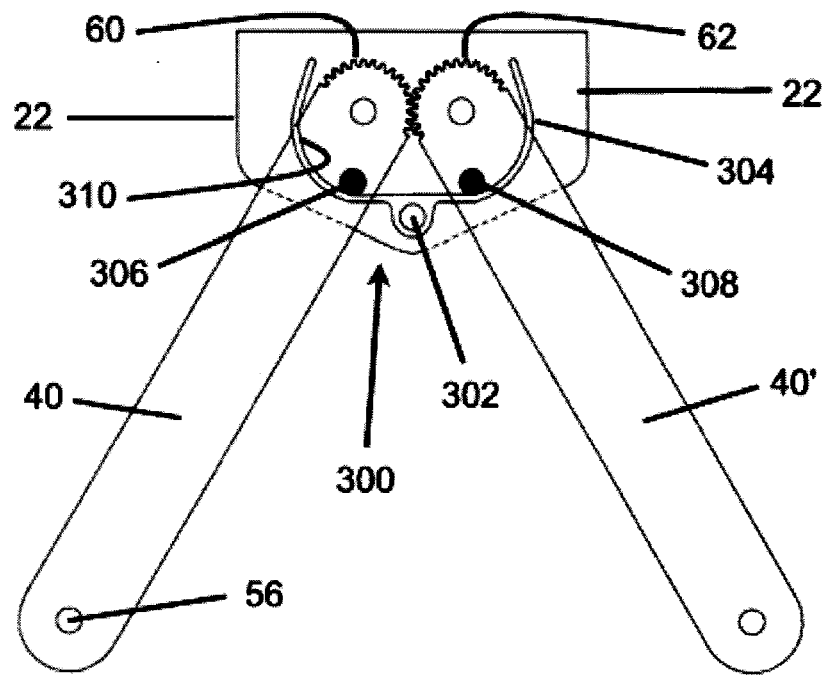
FIG. 9 is a side elevation of a movement mechanism portion of the embodiment of the support mechanism of FIG. 1 with an embodiment of a biasing mechanism in a first configuration.
Figure 10:
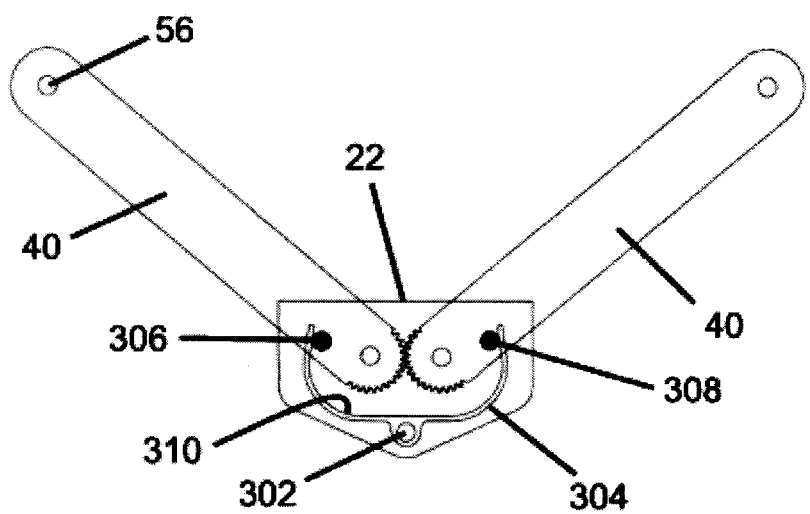
FIG. 10 is a side elevation of the portion of the support mechanism with the biasing mechanism of FIG. 9 in a second configuration.

Referring to FIGS. 9 and 10, a biasing mechanism 300 is applied to members 40 and 40' so as to urge members 40 and 40' to pivot to a desired position. In this embodiment the biasing mechanism 300 comprises a spring 304 coupled to the member 22 by a pin 302. A pin 306 projects from member 40 and a pin 308 projects from member 40', such that pivoting of the members 40 and 40' causes rotational movement of the respective pins 306 and 308 about the respective pivot points. In this embodiment the spring 304 is a double leaf spring and has a pair of curved surfaces 310, each of which is positioned relative the respective pivot point of the members 40 and 40' to cause the desired biasing as described below. In one embodiment, the curved shape is progressively closer to the pivot point along the length of each curve. Rotational movement of the members 40 and 40' causes the respective pin 306 or 308 to move along the respective curve. Consequently the spring is increasingly deflected when the members 40 and 40' are rotated so as to move apart. This applies an increasing resistance to this movement and resiliently urges the members 40 and 40' to rotate back to as to be at a neutral position.

The curve shape can be such that the neutral position is achieved when the members 40 and 40' are substantially in line. In this case when they are moved to be closer to each other in either direction (such as depicted in FIGS. 9 and 10) then the biasing mechanism urges them to return to the neutral position. The spring 304 can be shaped to give biasing force management through a movement sequence.

In an alternative one or both of the flexible bands 1302 and 1304 of FIGS. 32 and 33 could be a spring that urged the members 40 and 40' to return to a neutral position.

Figure 11:
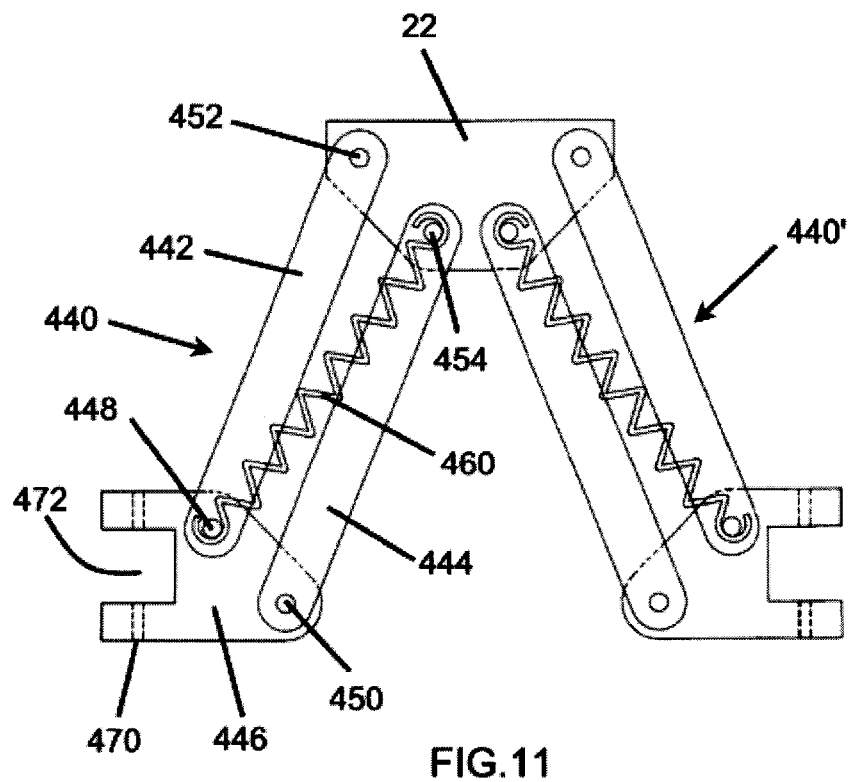
FIG. 11 is a side elevation of an alternative movement mechanism portion of the embodiment of the support mechanism of FIG. 1 with another embodiment of a biasing mechanism in a first configuration.
Figure 12:
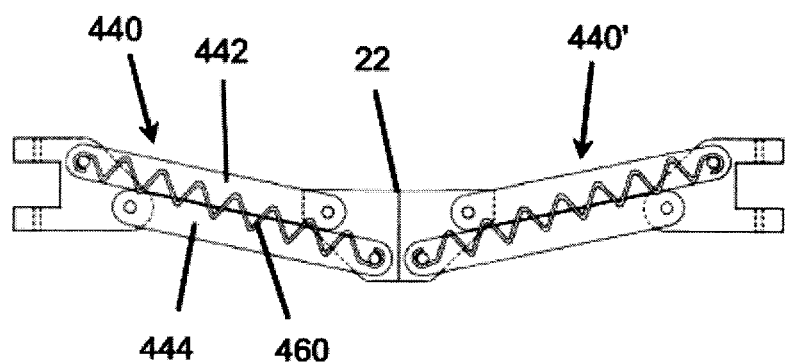
FIG. 12 is a side elevation of the portion of the support mechanism with the biasing mechanism of FIG. 11 in a second configuration.

Referring to FIGS. 11 and 12, the second movement mechanism is in the form of a first pair of parallel link arms 440 in place of member 40 and a second pair of parallel link arms 440' in place of member 40'. The joint member 34 is replaced with joint member 446, likewise with the other joint. The parallel link arms 440 comprise arm 442 and arm 444 in a parallel arrangement. Each is pivotally connected to the joint 446 and the member 22 at respective ends. The joint 446 has a hole 470 which coincides with line 54 for receiving a pin so as to pivotally connect the joint to member 32. The joint member 446 may have a cut-out 472 to make it lighter in weight.

Arm 442 is pivotally connected to the joint member 446 by a pin 448. Arm 444 is pivotally connected to the joint member 446 by a pin 450. Arm 442 is pivotally connected to the member 22 by a pin 452. Arm 444 is pivotally connected to the member 22 by a pin 454. The arms 440, joint member 446 and member 22 form a parallelogram, which results in the joint member 446 retaining its orientation with respect to member 22 (that is, a line between pins 448 and 450 will remain parallel to a line between pins 452 and 454) as the member 22 moves relative to joint member 446. Due to the parallelogram effect the link arms 440' also keep the joint members in line as the member 22 moves in relation to them. Additionally the joint members will move closer or further apart as the member 22 moves in relation to them. Either of the pins 448 and 450 function as the connection point 24.

In an embodiment, as shown, a biasing mechanism in the form of a helical spring 460 extends between pins 448 and 454. Alternatively it could extend between pins 450 and 452. The spring 460 urges pins 448 and 454 to move closer to each other. Movement of the member 22 in either direction from this closest (neutral) position will be resisted by stretch of the spring 460 and the resilience of the spring 460 will apply a force urging the movement of the member 22 relative to the joint member 446 to so that they return to the neutral position. The relative placement of the pins on joint member 446 and the member 22 will determine where the neutral position is located.

While only three forms of biasing mechanism have been described, it will be appreciated that other suitable forms of biasing can be employed. For example a biasing mechanism could extend between the joint members.

While the biasing mechanism has been described as applying to the second movement mechanism, it will be appreciated that a biasing mechanism could be employed within the first movement mechanism.

Figure 13:
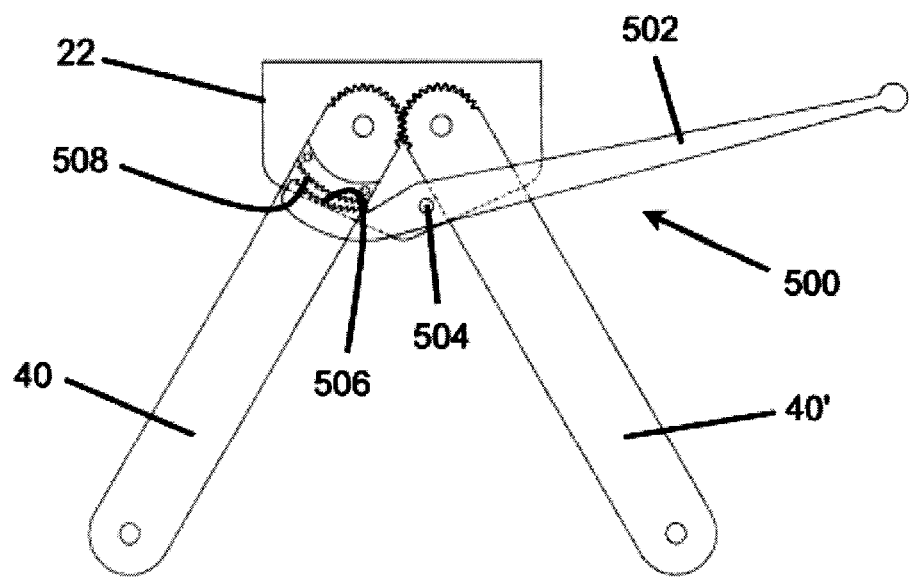
FIG. 13 is a side elevation of a movement mechanism portion of the embodiment of the support mechanism of FIG. 1 with an embodiment of a locking mechanism in a first configuration.
Figure 14:
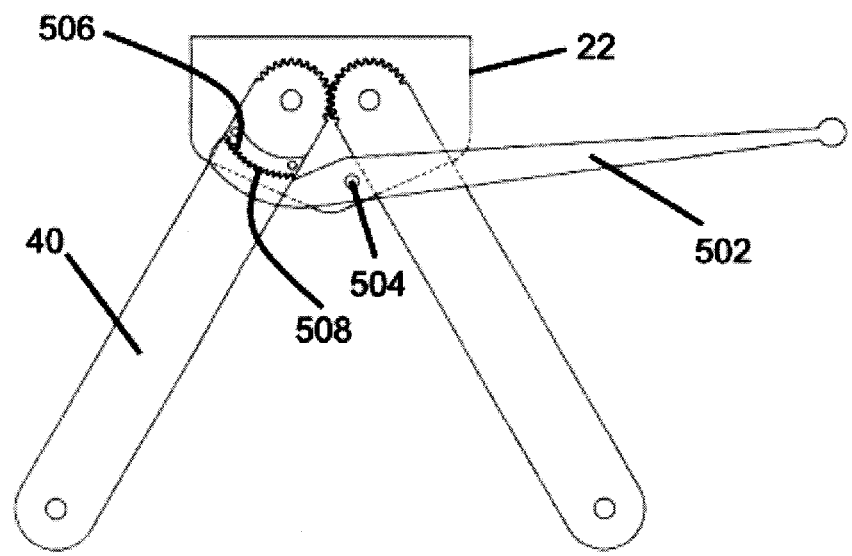
FIG. 14 is a side elevation of the portion of the support mechanism with the locking mechanism of FIG. 13 in a second configuration.

In FIGS. 13 and 14 a locking mechanism 500 is employed to lock the relative position of the member 40 in place with respect to the member 22. In this embodiment the locking mechanism comprises a handle 502 which pivots about pin 504. Pin 504 connects to member 22. The handle 502 comprises a pawl in the form of a concave surface on which there is a number of teeth 506. The member 40 comprises a gear portion having a convex shaped surface on which there are a number of teeth 508. The teeth 506 are arranged to interact with teeth 508 thereby preventing relative movement, preferably in either direction, when positioned as shown in FIG. 14, but in some embodiments the teeth are directionally biased to operate like a ratchet so that relative movement is only prevented in one direction. When the handle 502 is pivoted the pawl moves away and thus the teeth 506 disengage with the teeth 508, as shown in FIG. 13, thereby allowing relative movement. Preferably the handle 502 is biased such as with a spring to engage the pawl with the teeth 506.

Figure 15:
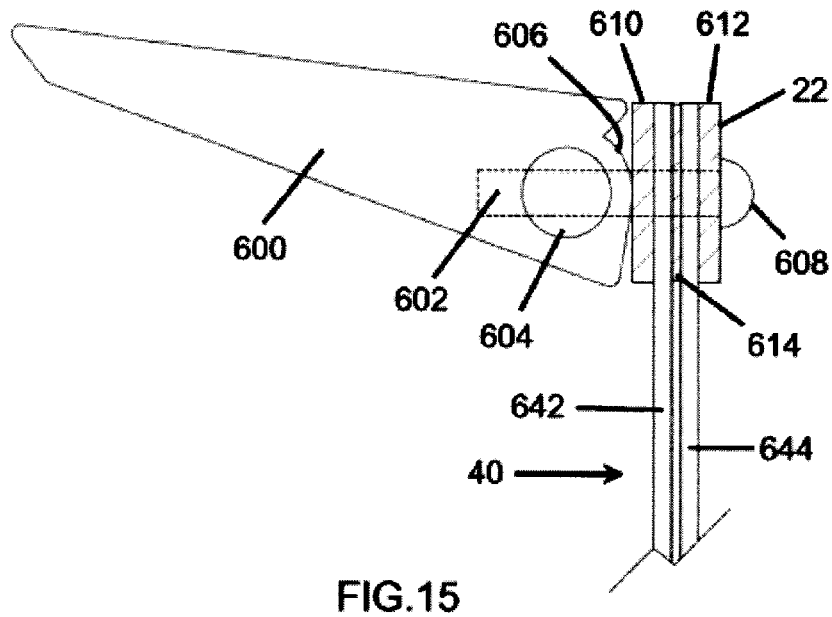
FIG. 15 is a side view of an alternative movement mechanism portion of the embodiment of the support mechanism of FIG. 1 with another embodiment of a locking mechanism in a first configuration.
Figure 16:
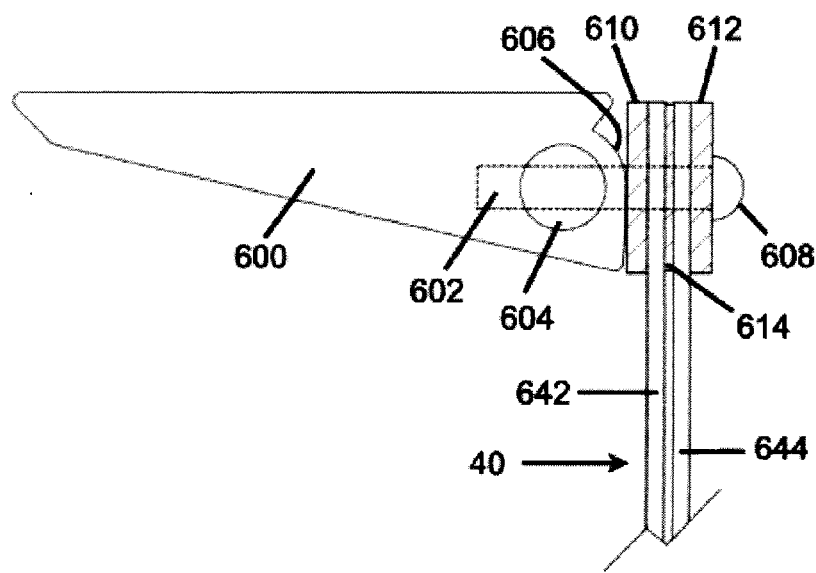
FIG. 16 is a side elevation of the portion of the support mechanism with the locking mechanism of FIG. 15 in a second configuration.

Referring to FIGS. 15 and 16, there is an alternative locking mechanism. In this embodiment member 40 comprises parallel layered bars 642 and 644, which have common pivot points at each end. Member 22 is connected to the keyboard rest (not shown) by bracket 600. The bracket 600 pivots about a pin that extends through and is rotatable in a hole 604 in the bracket 600. A shank 602 is secured to the pin through hole 64. The shank 602 extends from a head 608 through the member 22 and the pivot point about which member 40 pivots (that this through line 58). The member 22 comprises plates 610, 612 and 614. The plate 614 is sandwiched between bars 642 and 644 and the bars 642 and 644 are sandwiched between plates 610 and 612. A surface 606 abutting plate 610 is curved in shape. Preferably the surface forms an eccentric cam. Generally the plates 610, 612 and 614 and bars 642 and 644 are held in compression between the head 608 and the surface 606. In FIG. 15, when bracket 600 is lifted (and pivots about the pin in hole 604) the surface 606 moves downward relative to plate 610 so that a recess part of the curve is adjacent the plate 610. This lessens or eliminates the compression between the surface 606 and head 608. In FIG. 16, when bracket 600 is lowered, possibly due to gravity, (and the bracket pivots about the pin in hole 604) the surface 606 moves upward relative to plate 610 so that a cam part of the curve is adjacent the plate 610. This increases the compression between the surface 606 and head 608.

Due to the varied compression applied between the head 608 and surface 606 friction between the plates 610, 612 and 614 and the bars 642 and 644 is adjustable. In FIG. 16, when the friction is more the member 40 is braked. In FIG. 15 when the friction is less the member 40 will be able to pivot in relation to the member 22.

Figure 17:
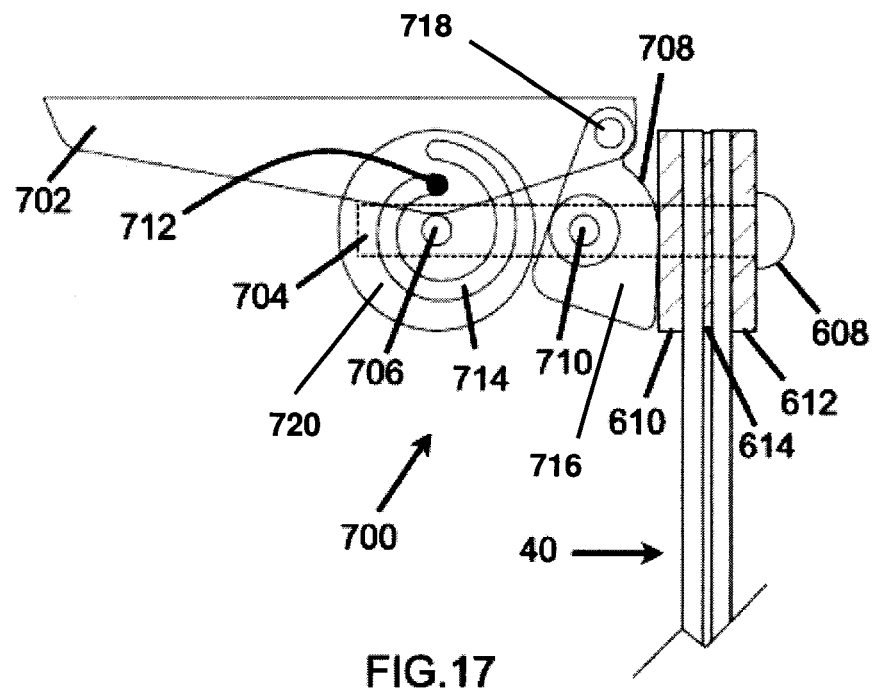
FIG. 17 is a side view of an alternative movement mechanism portion of the embodiment of the support mechanism of FIG. 15 with an embodiment of a tilt mechanism in a first configuration.
Figure 18:
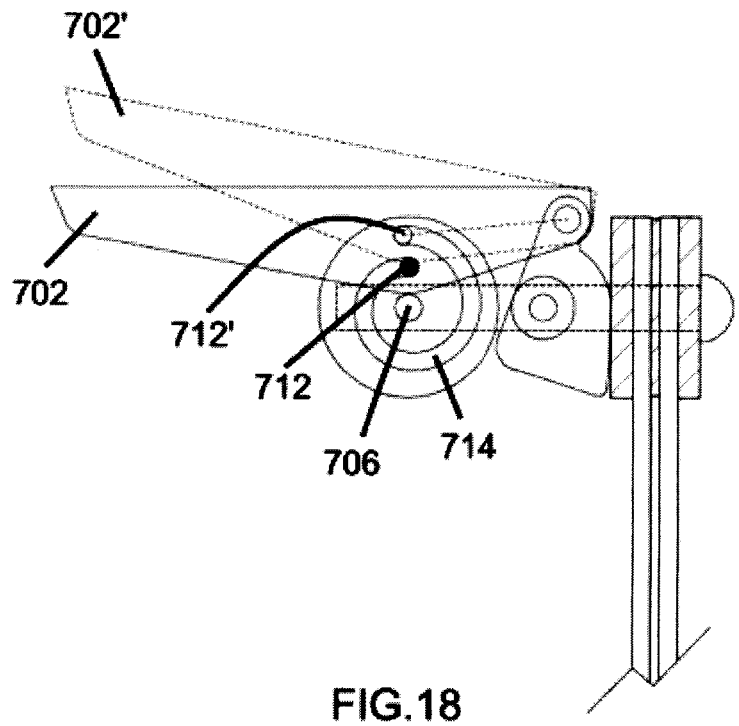
FIG. 18 is a side elevation of the portion of the support mechanism with the tilt mechanism of FIG. 17 in a second configuration.

Referring to FIGS. 17 and 18, there is an alternative locking mechanism and tilt adjustment mechanism 700. Member 40 comprises layered bars as described above in relation to FIG. 15. Member 22 is connected to the keyboard rest (not shown) by a cam member 716 having cam surface 708 similar to surface 606 and bracket 702. A shank 704 extends from a head 608 through the member 22 through the cam member 716 and the pivot point about which member 40 pivots (that this through line 58). The member 22 comprises plates 610, 612 and 614. The plate 614 is sandwiched between bars 642 and 644 and the bars 642 and 644 are sandwiched between plates 610 and 612. Cam member 716 pivots about a pin 710 which extends through the shank 704. Cam member 716 also pivots about pin 718 which extends through the cam member 716 and the bracket 702. This pivot point is arranged to cause to cause the cam member 716 to pivot about the pin 710 when the bracket is lifted or lowered so as to move the surface 708 and to apply compression between the surface 708 and the head 608 in the same manner as described in relation to FIG. 15 so as to clamp the member 40 and apply varying degrees of frictional braking.

A rotatable guide 720 is connected to the shank 704 by a pin 706 that extends through a hole in the shank 704. The pin 706 is further along the length of the shank 704 than the pin 710. The guide 720 has a spiral shaped channel 714 circling the pin 706 with a varied radius. Located within the channel 714 is a pin 712 which is connected to the bracket 702. The pin 712 is guided by the channel 714 so that when the pin 712 at the smaller radius end of the channel 714 (as shown in FIG. 17) the pin 712 positions the bracket 702 to be as a lower in position with respect to pin 718 and thus causes the cam member 716 to apply a high clamping force to the member 40. This will prevent pivoting of the member 40 with respect to the member 22.

As the guide 720 is rotated, the pin 712 moves through the channel 714 causing movement of the bracket 702 upward and towards the member 22, which will cause the cam member 716 to rotate about pin 710 so as to bring the recess portion of the surface 708 closer to the plate 610 thereby causing the cam member 716 to apply a lower clamping force to the member 40. This allows the member 40 to pivot with respect to the member 22.

Movement of the pin 712 finishes at the largest radius end of the channel 714 as shown in dashes lines in FIG. 18. Pin 712 will be in position 712' and the bracket will be in position 702'. This allows movement of a point of the rest 14 within a plane parallel to the y-axis to allow tilting of the surface to be angled with respect to the user.

In an embodiment the second fixing member 22 may provide a bearing to allow the second object to rotate with respect to a plane. For example this may allow rotation of the rest 14 with in a horizontal plane to allow swiveling, or through a vertical plane parallel with the x axis to allow sideways tilting.

It will be appreciated that these tilt mechanisms can be combined or other tilt mechanisms can be employed.

It will also be appreciated that the angle of member 40 could be varied with respect to the first plane 60 and the angle of the first plane could be varied with respect to the member 22 by use of suitable hinge mechanisms.

It will also be appreciated that actuators can be used to drive the pivoting members to a desired rotational position with respect to the respective pivot point. A suitable actuator may for example motivate a cog which engages with a gear, such as the gear having teeth 508 in FIG. 13 (without the locking mechanism). When the cog is fixed relative to member 22, its rotation would cause the member 40 pivot to a desired position. Other actuators could be used to drive pivoting/extension/contraction of members in the first movement mechanism.

FIGS. 19 to 23 show an alternative embodiment of a support mechanism 800. In this embodiment the fixing member 20 is in the form of a pair of spaced apart connection elements 804, which are optionally connected to each other by a link element 806. Each connection element 804 is in the form of a bar which is mounted to the first object (for example a desk, which is not shown). In one embodiment the connection element is in the form of a plurality of flat bars which are sandwiched together at the ends by fasteners. The link member 806 may be sandwiched between the bars. The link member 806 spaces the connection elements 804 a desired distance apart and also adds rigidity to the fixing member 20. The connection elements 804 may be spaced apart so than the first elongate members 30 and 30' can be positioned to be adjacent-most and in-line without touching, or cannot be so positioned without interfering with each other, depending on the desired configuration.

Figure 19:
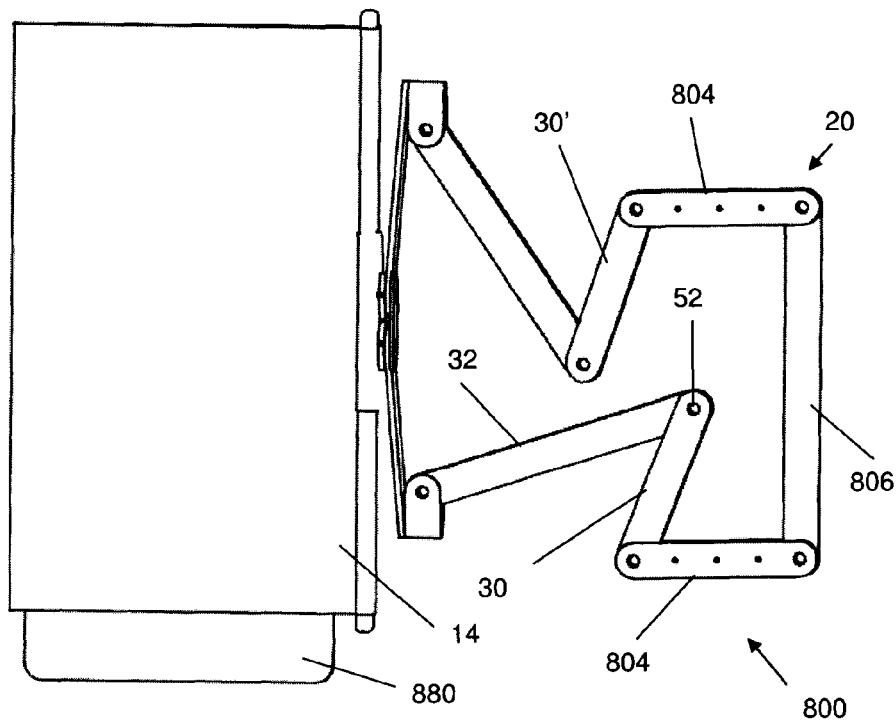
FIG. 19 is a plan view and a support mechanism according to a further embodiment of the present invention, when in a first configuration.
Figure 20:
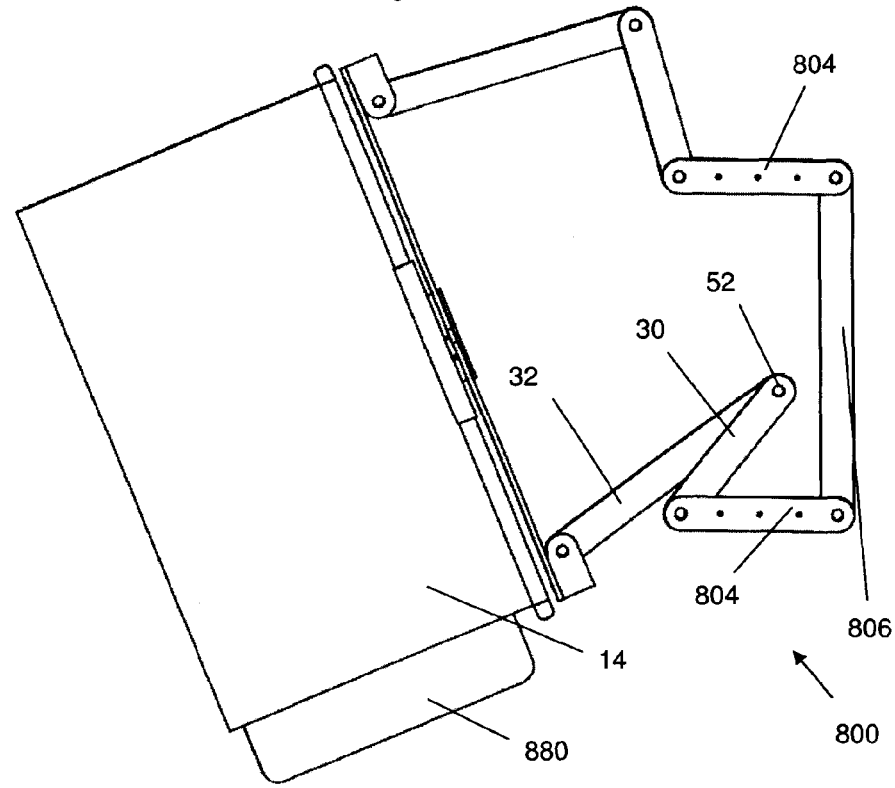
FIG. 20 is a plan view of the support mechanism of FIG. 19 in a second configuration.

It can be seen in FIG. 19 that this allows the pivot point 52 between first elongate member 30 and second elongate member 32 to move behind a line between the ends of the connection elements 804 to which the first elongate members 30 and 30' are connected. The effect of this is a larger range of movement. For example the position and orientation of the support mechanism 800 in FIG. 20 is now possible, when compared to the embodiment of FIG. 1. It can be seen in FIG. 21 that the link member 806 is positioned rearwardly relative to the rest of the support mechanism, whereas in FIG. 22, the link member is designated 806' and is positioned inwardly at the connection points of members 30 and 30' to the fixing member 20.

In this embodiment of the second object (keyboard rest 14), an extendable/retractable support 880 is shown. The support 880 is in the form of a tray arranged to slide in and slide out of a cavity of the second object. The support 880 is shown part retracted in FIGS. 19-21 and extended in FIG. 22. The support 880 can have detent means (not shown) which resists the support 880 from being removed from the rest 14. In use the support 880 can be used to support a computer mouse. This type of support can be employed on more than one side of the rest 14.

Figure 21:
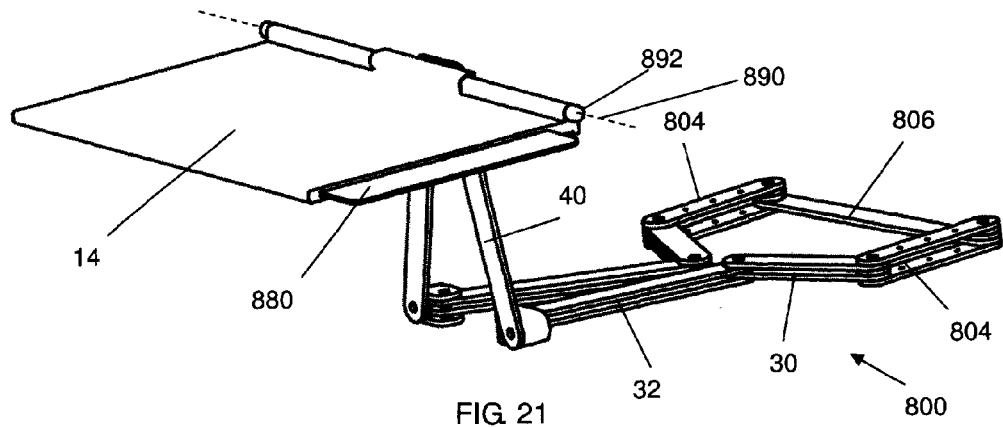
FIG. 21 is an upper perspective of the support mechanism of FIG. 19 in a third configuration.
Figure 22:
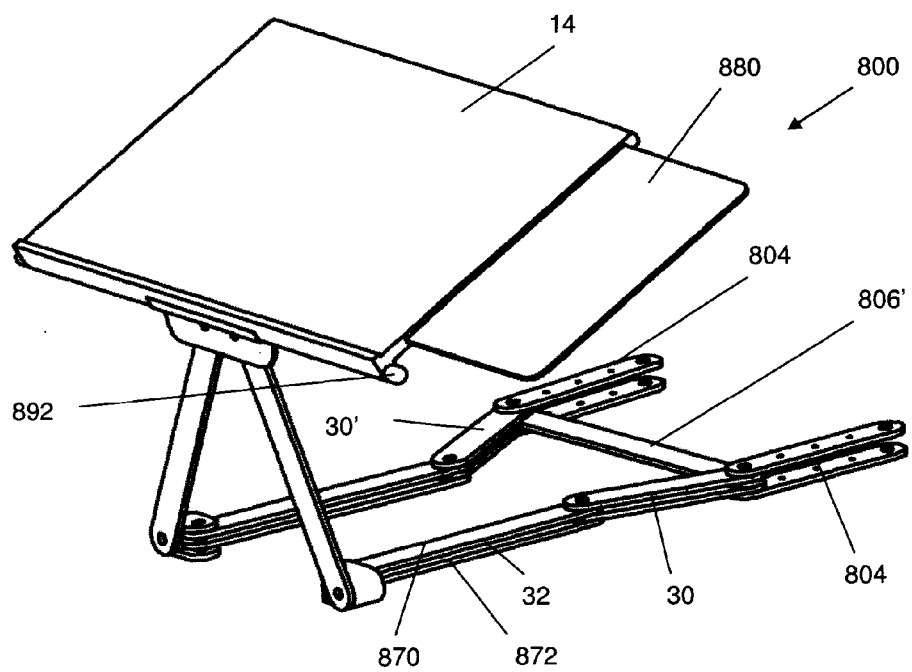
FIG. 22 is an upper perspective of a variation of the support mechanism of FIG. 19 in a fourth configuration.
Figure 23:
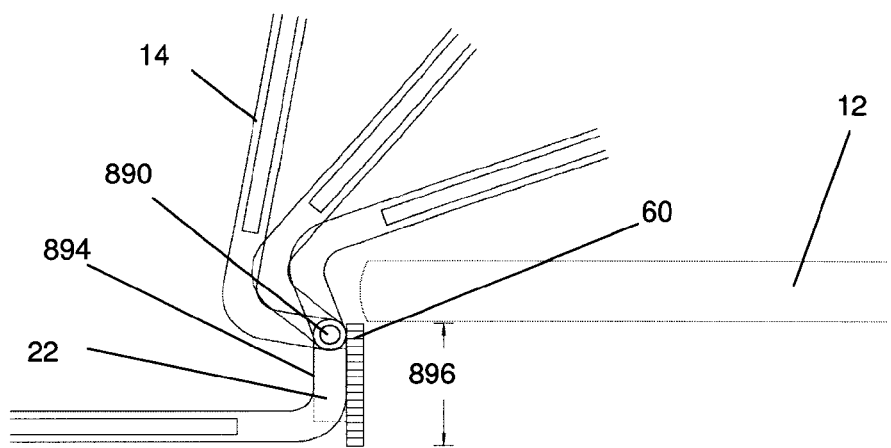
FIG. 23 is a side elevation of a portion of the support mechanism of FIG. 19 with a rest part shown in multiple positions.

As seen better in FIGS. 21, 22 and 23 this embodiment of the rest 14 is hinged through line 890 to the second fixing member 22 so that one side is presented to face upwardly so that this face is usable as an upwardly facing surface. This allows a point on the rest 14 to move through a plane orthogonal to the second plane through which the members 40 move. However the rest 14 may be flipped over so that the other side is presented to face upwardly so that the other face is usable as an upwardly facing surface. Further in the configuration in FIG. 21 the support extends generally in a direction away from the rest of the mechanism 800. In the configuration shown in FIG. 22 the support extends generally back over the rest of the mechanism 800, that is in the opposite direction to that in FIG. 21. This adds further flexibility to the use of the support mechanism and is ergonomically beneficial. It can be seen that this configuration is useful as for example an drawing surface that sits above the bench level of the desktop and is highly adjustable to suit the ideal position for the user, whilst still being able to be retracted and stowed away under the desktop. A knob or wheel 892 connected to a clutch or clamp mechanism may be provided to lock the rest 14 in position or allow it to be moved from one configuration to another as determined by the position of the wheel 892.

As shown in FIG. 23, the bracket for the rest 14 made be shaped to have an offset 894 whereby the planar surface of the rest 14 is offset from the pivot line 890 of the hinge. This is ideally slightly more than the thickness of the desktop 12. In this case the offset 894 is accomplished by making the bracket L shaped in cross-section, with the large part of the L coinciding with the surface of the rest 14 and the short part of the L being the offset 894. The offset 894 in this embodiment spaces the lowermost surface of the rest a distance 896 from the underside of the desktop 12.

FIGS. 21 and 22 also show an alternative form of the first elongate members 30 and 30' and second elongate members 32 and 32'. In this form they are a plurality of flat bars spaced apart by one of the other bars and sandwiched together by fasteners at each end. The fasteners form pivot points about which the members 30, 30', 32 and 32' are able to pivot. For example in FIG. 22 member 32 is comprised of parallel spaced apart flat bars 870 and 872.

Figure 24:
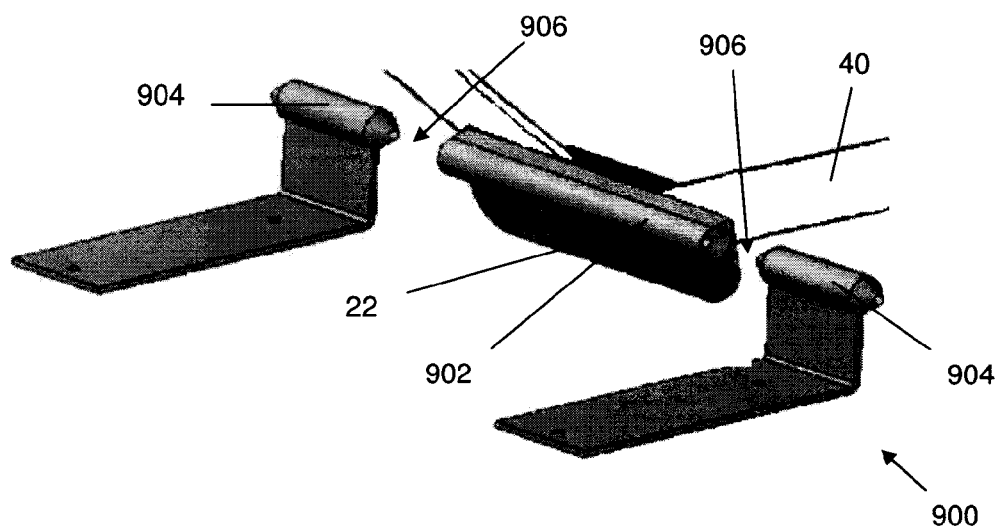
FIG. 24 is a schematically exploded perspective view of a rest angle locking mechanism of the portion shown in FIG. 23.

FIG. 24 shows an example of the hinge 900 used in the embodiment of FIGS. 21 and 22. In this example the hinge 900 comprises a first part 902 connected to or forming part of the second fixing member 22. The hinge 900 also comprises one or more second parts 904 pivotally coupled to the first part 902. In this embodiment one second part 904 is either side of the first part 902. Between each second part 904 and the first part 902 are opposed friction surfaces 906 which, when clamped between axial ends of the axis of rotation of the hinge 900, will lock the hinge 900. When released the second parts 904 are free to pivot about the axis of rotation.

The second parts 904 comprise third fixing members to connect to the rest 12 by mounting surfaces 908. The third fixing members rotate relative to the second fixing member in the form of part 902.

Figure 25:
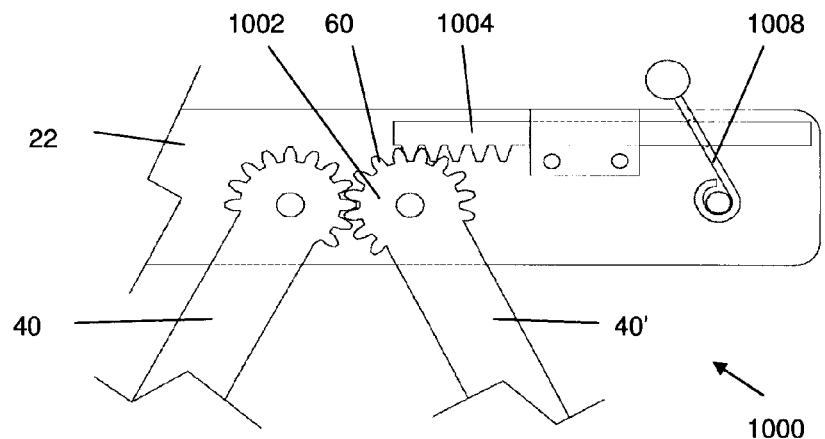
FIG. 25 is a rear side elevation of an embodiment of a height adjustment locking mechanism of the support mechanism of the present invention, when in a first configuration such that the height may be adjusted.
Figure 26:
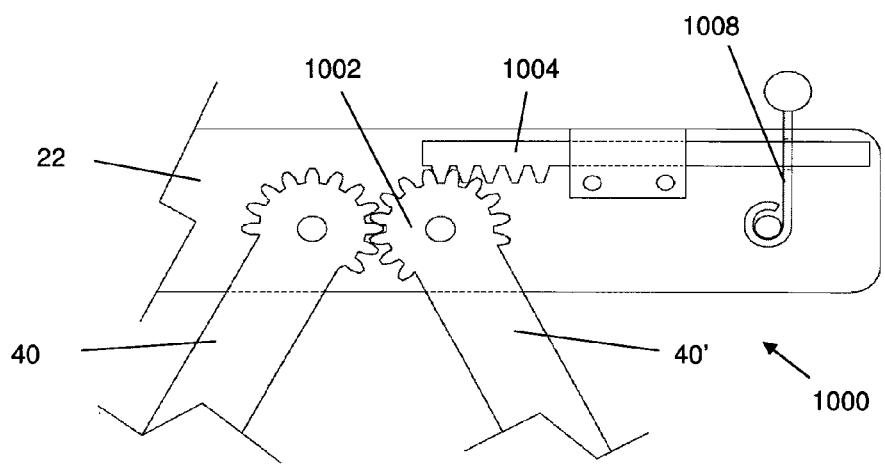
FIG. 26 is a rear side elevation of the height adjustment locking mechanism of FIG. 25, when in a second configuration such that the height is locked.

FIGS. 25 and 26 show a mechanism 1000 for altering the height of the second fixing member 22. Activation of the mechanism rotates the gears 1002 connected to members 40 and 40', which in turn raises or lowers the second fixing member 22. In this embodiment the mechanism is in the form of a rack and pinion, where the teeth 60 of one of the gears 1002 forms the pinion and an elongate member 1004 having corresponding teeth forms the rack. Connected to the rack is a lever 1008. In the embodiment shown the lever 1008 operates as a clamp on the rack 1004, which prevents it from moving. This in turn locks the gears and thus the height of the second fixing member 22. In an alternative the lever 1008 can be used to slide the rack 1004 along its length which in turn will drive the pinion to rotate and thus operates as an activator to raise or lower the height of the second fixing member 22. In an embodiment the rack 1004 can be motor driven.

Figure 27:
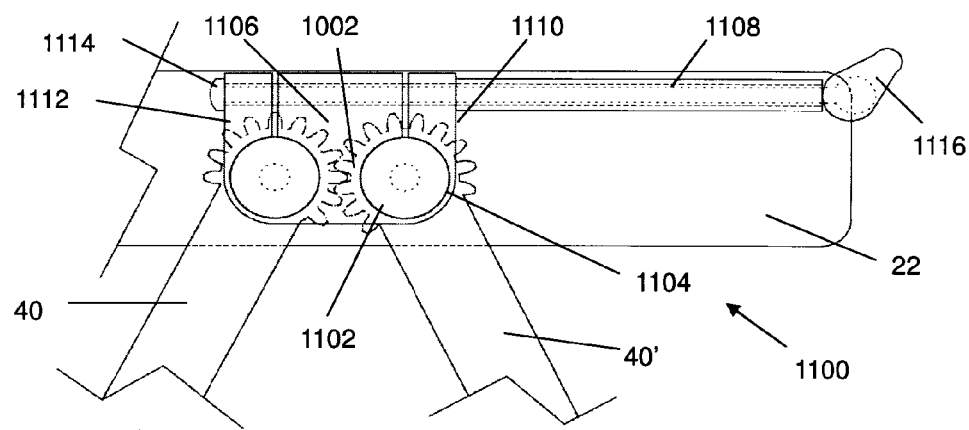
FIG. 27 is rear side elevation of an alternative embodiment of the height adjustment locking mechanism of the support mechanism of the present invention.

FIGS. 27 to 29 show a mechanism 1100 for locking the height of the support mechanism. In this embodiment each gear 1002 is connected to a follower drum 1102 around which is a split collar 1104 formed in a collar piece 1106. The split is able to be closed when the collar piece 1106 clamped between sides 1110 and 1112, which tightens the collar 1104 around the drum 1102 preventing it from rotating and thus locking the gears 1002. This in turn prevents pivoting of members 40 and 40' thereby preventing up and down movement of the second fixing member 22. Clamping of the collar piece 1106 and thus the collars 1104 is effected by fixing a first side 1110 of the collar piece 1106 in relation the second fixing member 22, having a rod 1108 pass through from the first side 1110 to the other side 1112 and providing the rod with a protrusion 1114 that engages the other side 1112. A tensioner can be used to forcibly pull the rod 1108 through the collar piece 1106. When the rod 1108 is forced through the collar piece 1106 the protrusion 1114 and thus the other side 1112 is forced towards the first side 1110 thereby clamping the collar piece 1106. The tensioner may be in the form of a threaded end of the rod 1108 in threaded engagement with the first side 1110 or with the fixing member 22, where rotation of the rod 1108 via lever 1116 draws the rod 1108 through the clamping piece 1106. Alternatively the tensioner may be in the form of rod 1108 having a thread 1120 in engagement with tread of the second side 1112 at one end of the rod 1108 and a knob or wheel 1118 fixed to the other end of the rod 1108, such that as the knob 1118 is rotated, the rod 1108 is driven through the collar piece 1106 causing it the clamp on the drums 1102.

Figure 31:
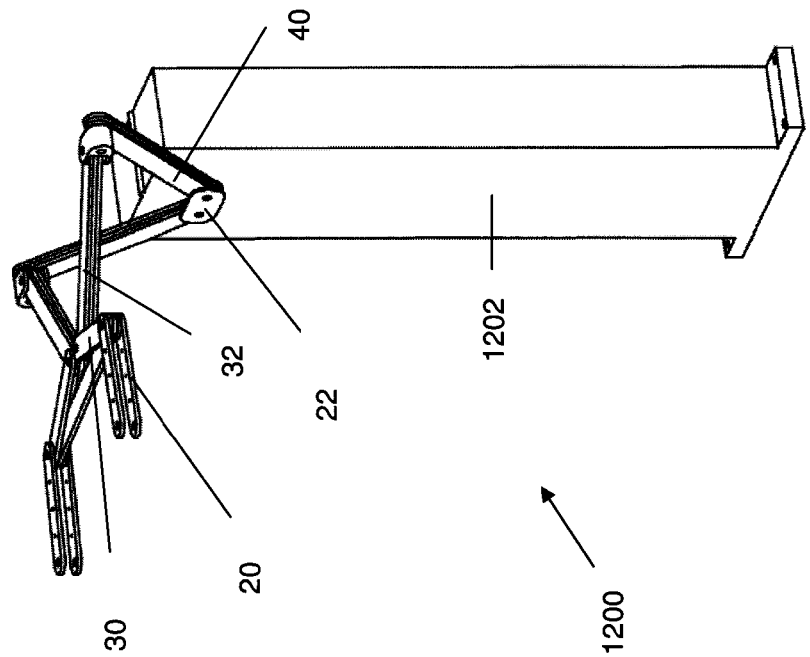
FIG. 31 is an upper perspective view of the support mechanism of FIG. 30 when in a second configuration.
Figure 30:
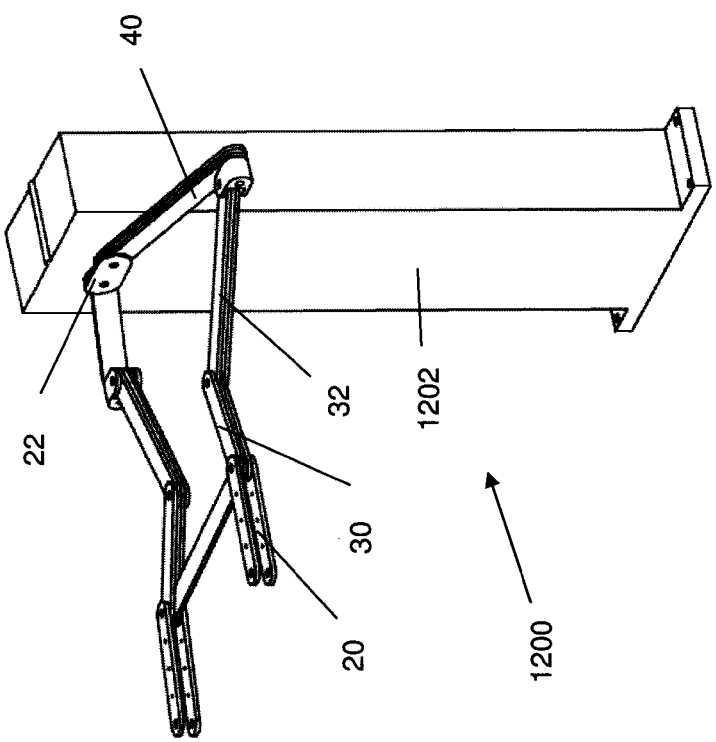
FIG. 30 is an upper perspective view of another embodiment of a support mechanism of the present invention when in a first configuration.

In an embodiment shown in FIGS. 30 and 31 the support mechanism may be used the other way around from the embodiments described above. In this embodiment of the support mechanism 1200 the second fixing member 22 is connected to a fixed body, such as pillar 1202. The first connecting member 20 is collected to a movable work piece, such as a bench, platform, keyboard rest etc (not shown). The support mechanism 1200 functions the same as described above only that the relative movement of the second fixing member 22 in relation to the first fixing member 20 is reversed. That is fixing member 20 moves instead of fixing member 22. Specifically the members 40 and 40' move through one plane, which is in this case is parallel to a side wall of the pillar 1202. The members 30, 30', 32 and 32 move through another plane, which is at an angle to, and in this case orthogonal to, the first plane, thereby allowing the fixing member 20 to move toward and away from the pillar 1202 and up and down relative to the pillar 1202. It is noted that the second fixing member can be movable as well, for example if the height of the pillar 1202 was adjustable or it can be rotatable about its length or pivotable with respect to a horizontal plane.

Figure 34:
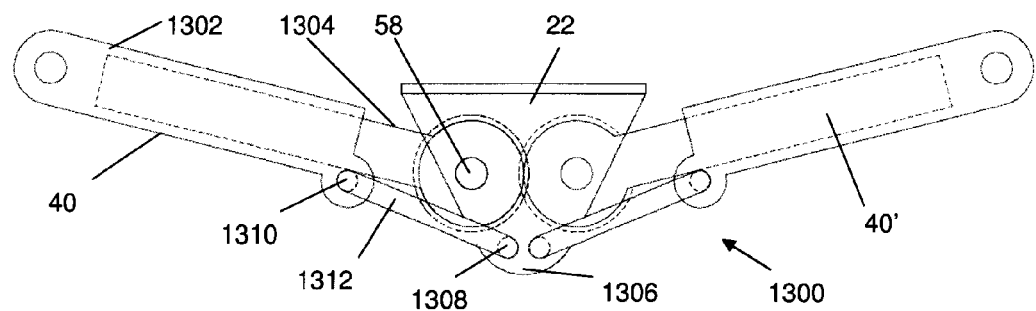
FIG. 34 is a partial rear side elevation of an alternative second extension mechanism in a first configuration.
Figure 35:
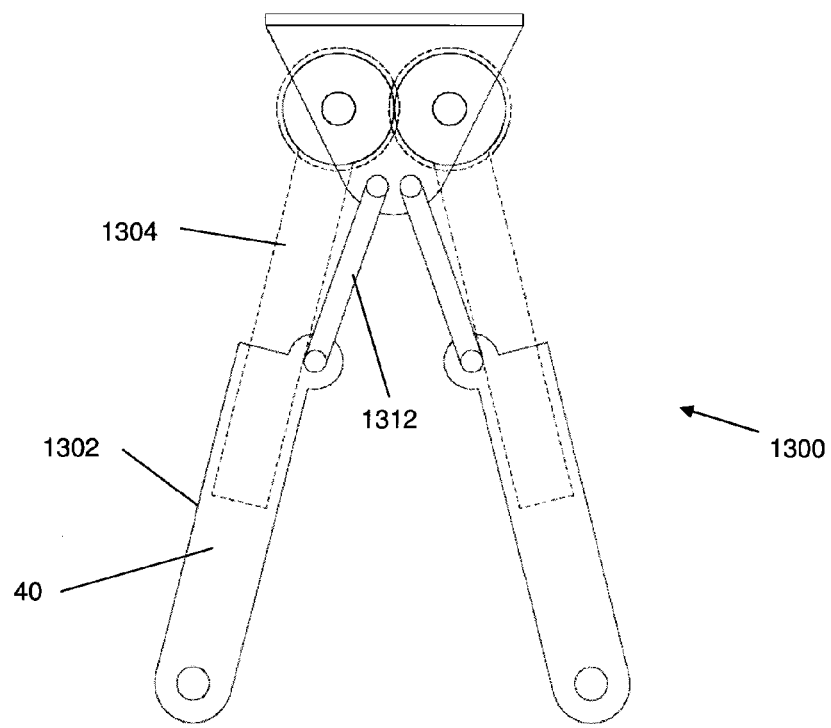
FIG. 35 is a partial rear side elevation of the mechanism of FIG. 34 when in a second configuration.

FIGS. 34 and 35 show an example of members 40 and 40' being telescopic. In this embodiment of the support mechanism 1300, the member 40 has an outer sleeve 1302 and an inner member 1304 telescopically extending from inside the sleeve 1302 to the fixing member 22. In this embodiment the member 22 has a projection 1306. The projection has a hole for receiving a turned end of a rod 1308 which connects to an eye 1310 for receiving another turned end of the rod 1312. The eye 1310 is positioned at the end of the sleeve 1302 closest to the member 22. The rod 1312 forces the end of the sleeve to be at a constant radius from the hole 1308. As the sleeve 1302 rotates about the line 58, this causes the sleeve to move away from the line 58 as it is depicted in FIG. 34 to a position as depicted in FIG. 35. This in turn causes extension of the member 1304 from the sleeve 1302. When rotated the other way the member 1304 will contract back into the sleeve 1302. The sleeve 1302 and member 1304 may be in the form of a gas strut, which compresses a gas inside the sleeve as the member 1304 is contracted into the sleeve 1302. The compressed gas will urge the member 1304 to extend from the sleeve 1302 so as to provide a biasing force to return the member 40 to a neutral position relative to the member 22. Alternative hydraulic or pneumatic mechanisms can be employed to varied the biasing to be as desired. Member 40' is constructed similarly to member 40.

Figure 36:
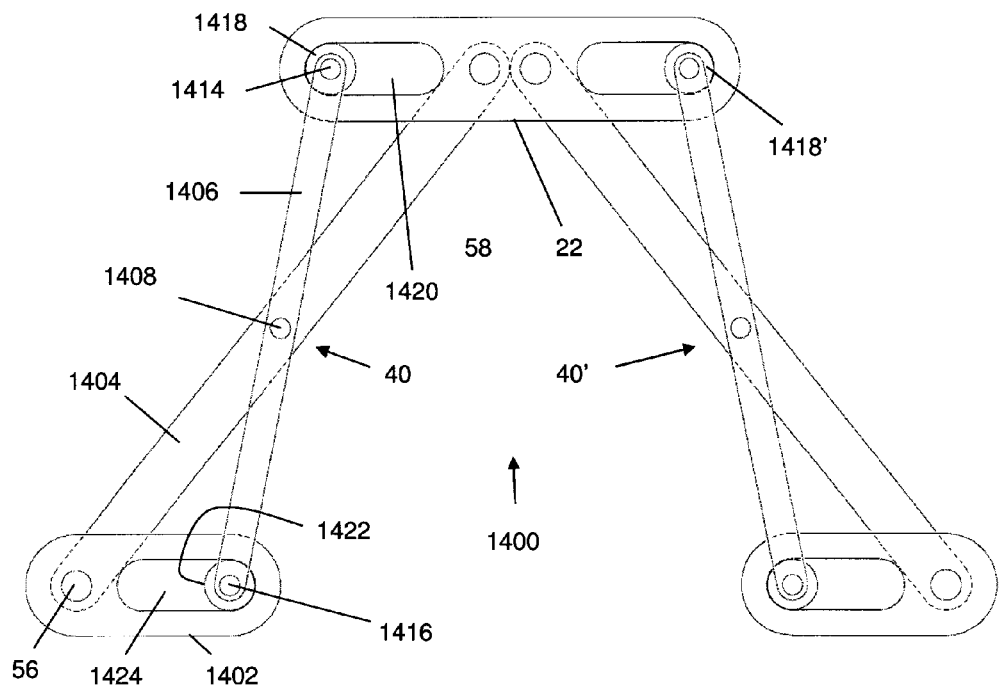
FIG. 36 is a partial rear side elevation of an alternative second extension mechanism in a first configuration.
Figure 37:
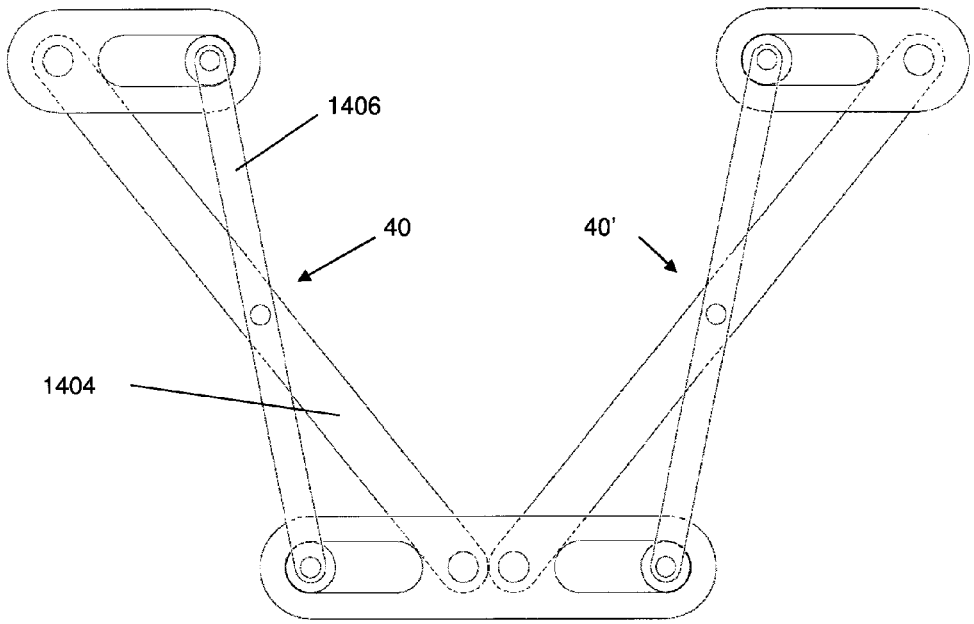
FIG. 37 is a partial rear side elevation of the mechanism of FIG. 36 when in a second configuration.

FIGS. 36 and 37 show a further alternative to members 40 and 40'. In this embodiment of the support mechanism 1400, the member 40 comprises cross bars 1404 and 1406 and a connection member 1402 that is in a revolute connection with the connection point 24 through line 56. The member 1402 comprises a slot 1424 for receiving a wheel or slider 1422 and for allowing the slider 1422 to travel inside the slot 1424. The bar 1404 is pivotally connected to bar 1406 at pivot point 1408. The bar 1404 is pivotally connected to the connection point 24 and the member 1402 at the line 56. The bar 1404 is pivotally connected to the member 22 at line 58. The member 22 comprises a slot 1420 for receiving a wheel or slider 1418 and for allowing the slider 1418 to travel inside the slot 1420. The sliders 1418 and 1422 are rotationally connected to the bar 1406 at points 1414 and 1416 respectively. As the member 22 is lowered relative to the connection points, starting as depicted in FIG. 36 and moving to the position as depicted in FIG. 37, the sliders 1418 and 1422 will slide within the respective slots 1420 and 1424. When the member 22 is substantially level with the connection points the sliders 1418 and 1422 will be at substantially opposite ends of the slots and then will move back again to the positions shown in FIG. 37. A spring (not shown) may extend between the sliders 1418 and 1418' to provide a biasing force to urge the member 22 to return to a neutral position.

Figure 38:
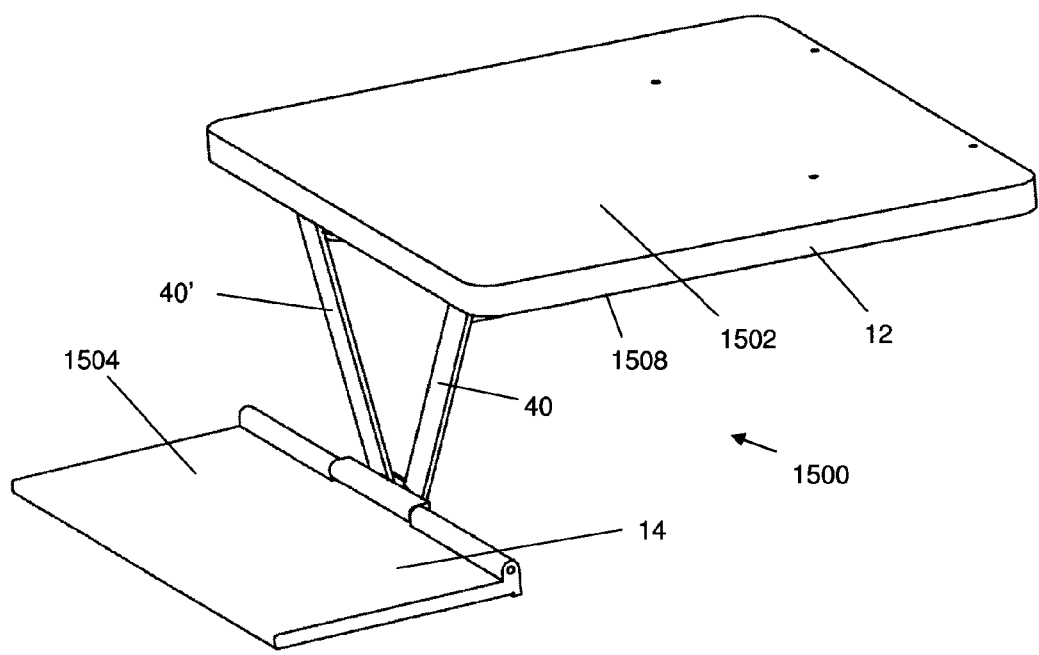
FIG. 38 is an upper perspective view of the support mechanism of FIG. 19 when in a fourth configuration.
Figure 39:
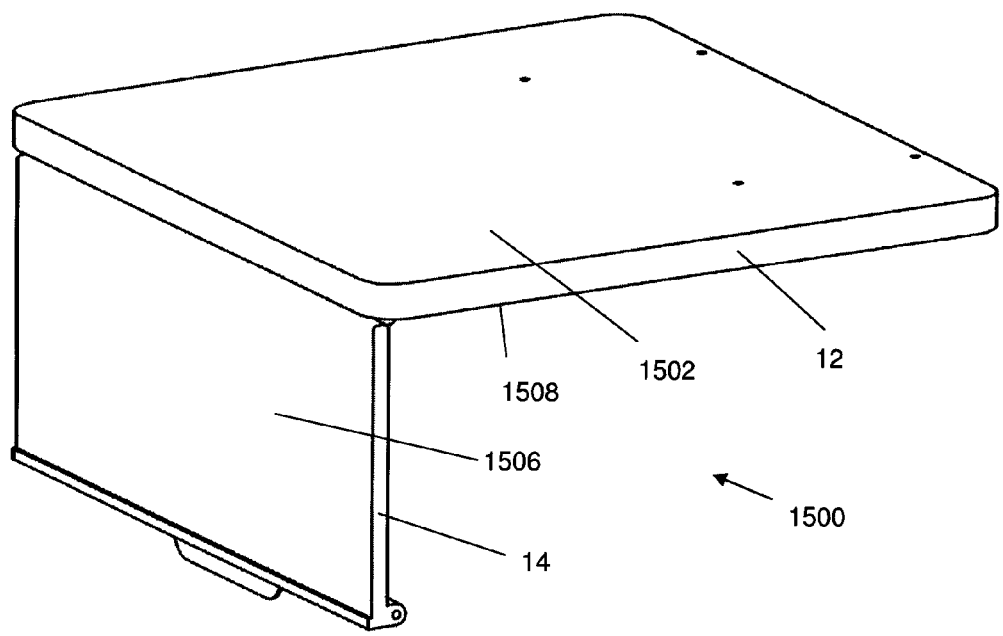
FIG. 39 is an upper perspective view of the support mechanism of FIG. 19 when in a fifth configuration.

Referring to FIGS. 38 and 39, where in this embodiment of the support mechanism 1500 the desktop has an upper surface 1502 and the rest 14 has a first surface 1504 and a second opposite surface 1506. This embodiment employs the hinge of FIGS. 19 to 24. In the configuration of FIG. 38 the rest 14 is drawn out from under the desktop 12 and lowered. Surface 1504 of the rest is seen. The rest 14 is then pivoted about the hinge so that surface 1506 is seen. In this configuration the surface 1506 is perpendicular to the surface 1502 and the rest 14 is flush against the underside 1508 of the desktop 12.

The present invention is advantageous in that it provides a high degree of flexibility in the positioning of the second object being supported in relation to the first object. The present invention can be employed in numerous applications in addition to the desktop and keyboard rest 10 described above. Some examples include use as a display mount support, an inspection or work platform support, a retractable storage tray or rack support, or a lifting device support, a cantilevered support for an object such as a sun blind/shade, or loading platform for loading into a vehicle. Some of these applications will benefit from powered actuation as described above.

In this specification the terms "comprising" or "comprises" are used inclusively and not exclusively or exhaustively.

Modifications may be made to the present invention with the context of that described and shown in the drawings. Such modifications are intended to form part of the invention described in this specification.

The invention claimed is:

1. A support mechanism comprising:
   a first fixing member for fixing to a first object;
   a second fixing member for fixing a second object;
   a first movement mechanism configured to support a pair of connection joints and further configured to only allow movement of the plurality of connection joints within a first plane extending from the first fixing member, where the distance between the joints is variable; and
   a second movement mechanism configured to support the second fixing member and further configured to allow straight line movement of the second fixing member in a direction that is transverse to the first plane, wherein the second movement mechanism is connected to and supported from the pair of connection points, and the second movement mechanism comprises two elongate members rotationally connected to the second fixing member such that the elongate members are constrained so that a change in angle of one of the elongate members relative to the second fixing member is matched by a change in angle of the other of the elongate members relative to the second fixing member, but in the opposite rotational direction.

2. The support mechanism according to claim 1, wherein one or more of the connection joints is movable in an arc of variable radius relative to the second fixing member.

3. The support mechanism according to claim 1, wherein one or more of the connection joints is movable in an arc of variable radius relative to the first fixing member.

4. The support mechanism according to claim 1, wherein one of more of the elongate members is telescopically extendable.

5. The support mechanism according to claim 1, wherein the second fixing member comprises a pivot mechanism for rotating the second object through a third plane that is either parallel to or orthogonal to a second plane through which extends a line in the direction transverse to the first plane.

6. The support mechanism according to claim 1, wherein the first movement mechanism comprises a pair of extension members, each having a first end pivotally connected to the first fixing member and a second end pivotally connected to a respective one of the connection joints, where the distance from each first end to the corresponding second end is variable.

7. The support mechanism according to claim 6, wherein each extension member comprises an articulation mechanism.

8. The support mechanism according to claim 6, wherein each extension member comprises an extension and retraction mechanism.

9. The support mechanism according to claim 1, wherein the elongate members each comprise a gear interlocked together so as to force the angles of rotation to be the same, but in opposite directions.

10. The support mechanism according to claim 1, wherein each connection joint is pivotable through an arc coinciding with or parallel to the first plane.

11. The support mechanism according to claim 1, wherein each elongate member is pivotally connected to a respective one of the connection joints.

12. The support mechanism according to claim 1, wherein the second movement mechanism is configured to lock the second fixing member at a position in the second plane by locking the angle of at least one of the elongate members relative to the second fixing member.

13. The support mechanism as claimed in claim 1, wherein the second movement mechanism is configured to lock the connection joints at respective positions in the first plane by locking the angle of at least one of the elongate members relative to the second fixing member.

14. The support mechanism according to claim 1, wherein the second fixing member comprises a pivot mechanism for rotating the second object through a third plane that is orthogonal to a second plane through which extends a line that extends in the direction transverse to the first plane, and the second fixing member is rotatable within a fourth plane which is orthogonal to the second and third planes.

15. The support mechanism according to claim 14, wherein the second fixing member is rotatable within a fifth plane parallel to the second plane.

16. The support mechanism according to claim 1, wherein the second movement mechanism is configured to invert the second object from an end or side when positioned such that the connection joints are moved beyond an extremity of the first object and the second fixing member is moved from one side of the first object to the other side of the first object.

17. The support mechanism according to claim 1, wherein the first movement mechanism configured to guide the connection joints towards or away from the first fixing member so that spacing between the connection joints is constant when in a first configuration or guide the connection joints laterally with respect to the first fixing member so that the spacing therebetween changes, but the distance from the first fixing member is constant when in a second configuration.

18. The support mechanism according to claim 1, wherein the first movement mechanism comprises a track and a slider captured within the track, where the track permits movement of the slider in two dimensions within the first plane, wherein the slider supports one of the connection joints.

19. The support mechanism according to claim 1, wherein the second fixing member remains parallel to the joints when it moves in the direction transverse to the first plane.

20. The support mechanism according to claim 1, wherein the support further comprises a locking mechanism that engages teeth of at least one of the elongate members when activated so at to prevent rotation of the respective elongate member relative to the second fixing member.

21. The support mechanism according to claim 1, wherein the support further comprises a clamping mechanism that prevents rotation of at least one of the elongate members relative to the second fixing member.

22. The support mechanism according to claim 1, wherein the two elongate members are each rotationally connected to the second fixing member so as to pivot about and extend in length radially from an axis of rotation.

23. A support mechanism comprising:
a first fixing member for fixing to a first object;
a second fixing member for fixing a second object;
a first movement mechanism configured to support a pair of connection joints, where the distance between the joints is variable; and
a second movement mechanism configured to support the second fixing member, wherein the second movement mechanism is connected to and supported from each of the pair of connection joints by a respective elongate member rotationally connected to the second fixing member, wherein the elongate members are constrained so that a change in angle of one of the elongate members relative to the second fixing member is matched by a change in angle of the other of the elongate members relative to the second fixing member, but in the opposite rotational direction, wherein the second fixing member remains parallel to the joints when it moves, wherein the support further comprises a biasing mechanism urging the joints to converge.

24. A support mechanism comprising:
a first fixing member for fixing to a first object;
a second fixing member for fixing a second object;
a first movement mechanism configured to support a pair of connection joints, where the distance between the joints is variable; and
a second movement mechanism configured to support the second fixing member while permitting substantially vertical movement of the second fixing member, wherein the second movement mechanism is connected to and supported from each of the pair of connection joints by a respective elongate member rotationally connected to the second fixing member, wherein the elongate members are constrained so that a change in angle of one of the elongate members relative to the second fixing member is matched by a change in angle of the other of the elongate members relative to the second fixing member, but in the opposite rotational direction, wherein the second fixing member remains parallel to the joints when it moves, wherein the second movement mechanism is configured to permit vertical movement of the second fixing member to a position above a horizontal plane that passes through the connection joints and is configured to permit vertical movement of the second fixing member to another position below the horizontal plane.

25. A support mechanism comprising:
a first fixing member for fixing to a first object;
a second fixing member for fixing a second object;
a first movement mechanism configured to support a pair of spaced apart pins projecting away from the first movement mechanism in a direction away the first fixing member, where the distance between the pins is variable; and
a second movement mechanism which comprises an elongate member rotationally connected to each pin so as to radially extend from the pin;
wherein the elongate members are rotationally coupled to a respective pin of the second fixing member such that each elongate member extends radially from the respective second fixing members' pins, wherein the elongate members are constrained so that a change in angle of one of the elongate members relative to the second fixing member is matched by a change in angle of the other of the elongate members relative to the second fixing member, but in the opposite rotational direction.

* * * * *